(12) United States Patent
Rodrig et al.

(10) Patent No.: US 10,019,145 B2
(45) Date of Patent: Jul. 10, 2018

(54) COMMAND USER INTERFACE FOR DISPLAYING AND SCALING SELECTABLE CONTROLS AND COMMANDS

(71) Applicant: Microsoft Technology Licensing, LLC, Redmond, WA (US)

(72) Inventors: Maya Rodrig, Seattle, WA (US); Erez Kikin-gil, Bellevue, WA (US); Charles Scott Walker, Sammamish, WA (US); Benjamin Rea Howell, Seattle, WA (US); Han-Wen Yeh, Bellevue, WA (US); Alexandre Grigorovitch, Redmond, WA (US); Diego Felipe Martínez Díaz, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 278 days.

(21) Appl. No.: 15/085,487

(22) Filed: Mar. 30, 2016

(65) Prior Publication Data
US 2016/0210035 A1 Jul. 21, 2016

Related U.S. Application Data

(63) Continuation of application No. 14/254,681, filed on Apr. 16, 2014, now Pat. No. 9,329,761.
(Continued)

(51) Int. Cl.
*G06F 3/048* (2013.01)
*G06F 3/0484* (2013.01)
(Continued)

(52) U.S. Cl.
CPC ........ *G06F 3/04847* (2013.01); *G06F 3/0482* (2013.01); *G06F 3/0483* (2013.01);
(Continued)

(58) Field of Classification Search
CPC .................................................. G06F 3/04842
(Continued)

(56) References Cited

U.S. PATENT DOCUMENTS

| | | |
|---|---|---|
| 5,060,170 A | 10/1991 | Bourgeois |
| 6,232,972 B1 | 5/2001 | Arcuri et al. |

(Continued)

FOREIGN PATENT DOCUMENTS

| | | |
|---|---|---|
| EP | 1174787 | 1/2002 |
| EP | 1628197 | 2/2006 |

OTHER PUBLICATIONS

U.S. Appl. No. 14/338,078, Amendment and Response filed Sep. 16, 2016, 14 pages.
(Continued)

*Primary Examiner* — William Titcomb

(57) ABSTRACT

Methods and systems are provided for an improved user interface for displaying and scaling selectable software commands and controls in at least one of a first ribbon and a second ribbon. Underneath a first ribbon of top-level command tabs, selectable controls associated with a selected command tab are presented in logical subgroups or chunks. The selectable controls within the chunks are granularly scaled to accommodate different screen sizes or changes in window size. The scaling includes moving a subset of the selectable controls within at least one of the chunks between an overflow pane and the second ribbon.

20 Claims, 15 Drawing Sheets

Related U.S. Application Data

(60) Provisional application No. 61/973,729, filed on Apr. 1, 2014.

(51) Int. Cl.
  *G06F 3/0485* (2013.01)
  *G06F 3/0482* (2013.01)
  *G06F 3/0483* (2013.01)
  *G06F 9/451* (2018.01)

(52) U.S. Cl.
  CPC ........ *G06F 3/0485* (2013.01); *G06F 3/04842* (2013.01); *G06F 9/451* (2018.02); *G06F 2203/04803* (2013.01)

(58) Field of Classification Search
  USPC ........................................................ 715/771
  See application file for complete search history.

(56) References Cited

U.S. PATENT DOCUMENTS

| | | |
|---|---|---|
| 6,452,597 B1 | 9/2002 | Goldberg |
| 7,703,036 B2 | 4/2010 | Satterfield et al. |
| 7,779,367 B2 | 8/2010 | Oshiro et al. |
| 8,296,673 B2 | 10/2012 | Lipstein et al. |
| 8,631,350 B2 | 1/2014 | Lepage et al. |
| 9,329,761 B2 * | 5/2016 | Rodrig ................ G06F 3/04842 |
| 9,639,237 B2 * | 5/2017 | Washington .......... G06F 3/0482 |
| 2006/0036965 A1 | 2/2006 | Harris |
| 2006/0250834 A1 | 11/2006 | Chinn et al. |
| 2006/0277478 A1 | 12/2006 | Seraji et al. |
| 2007/0055936 A1 | 3/2007 | Dhanjal |
| 2009/0228820 A1 | 9/2009 | Kim et al. |
| 2009/0271735 A1 | 10/2009 | Anderson et al. |
| 2010/0211908 A1 | 8/2010 | Luk |
| 2011/0173556 A1 | 7/2011 | Czerwinski et al. |
| 2012/0029661 A1 | 2/2012 | Jones et al. |
| 2012/0066642 A1 | 3/2012 | Shi |
| 2012/0110507 A1 * | 5/2012 | Washington .......... G06F 3/0482 715/825 |
| 2012/0293543 A1 | 11/2012 | Jardine-Skinner |
| 2013/0014050 A1 | 1/2013 | Queru |
| 2013/0019175 A1 | 1/2013 | Koller et al. |
| 2013/0086461 A1 | 4/2013 | Ashley-Rollman |
| 2013/0086507 A1 | 4/2013 | Poston et al. |
| 2013/0091205 A1 | 4/2013 | Kotler |
| 2013/0091440 A1 | 4/2013 | Kotler |
| 2013/0091453 A1 | 4/2013 | Kotler |
| 2013/0091465 A1 | 4/2013 | Kikin-Gil |
| 2013/0097481 A1 | 4/2013 | Kotler |
| 2013/0097490 A1 | 4/2013 | Kotler |
| 2013/0117658 A1 | 5/2013 | Fidler et al. |
| 2013/0174047 A1 | 7/2013 | Sivakumar et al. |
| 2013/0191781 A1 | 7/2013 | Radakovitz et al. |
| 2013/0212484 A1 | 8/2013 | Joshi et al. |
| 2014/0019896 A1 | 1/2014 | Satterfield et al. |
| 2014/0157169 A1 | 6/2014 | Kikin-Gil |
| 2014/0173602 A1 | 6/2014 | Kikin-Gil et al. |
| 2014/0181708 A1 | 6/2014 | Kikin-Gil et al. |
| 2015/0277682 A1 | 10/2015 | Kaufthal et al. |
| 2015/0341399 A1 * | 11/2015 | Lee ....................... H04L 65/403 715/255 |

OTHER PUBLICATIONS

U.S. Appl. No. 14/338,078, Office Action dated Dec. 30, 2016, 33 pgs.

European Communication in Application 15716296.7, dated Nov. 8, 2016, 2 pgs.

Gajos, et al., "Automatically Generating Personalized User Interfaces With Supple", In Proceedings of Artificial Intelligence, vol. 174, Issue 12, Aug. 1, 2010, pp. 910-950.

Gajos, et al., "Exploring the Design Space for Adaptive Graphical User Interfaces", In Proceedings of the Working Conference on Advanced Visual Interfaces, May 6, 2006, pp. 201-208.

International Search Report and Written Opinion Issued in PCT Application No. PCT/US2015/022887, dated Jun. 26, 2015, 12 Pages.

Lambert, Joan, Step by Step Microsoft Word 2013, Published on: Mar. 1, 2013, Available at: https://dbgyan.files.wordpress.com/2013/02/0735669120_wor.pdf.

PCT 2nd Written Opinion in International Application PCT/US20151022886, dated Jun. 16, 2016, 9 pgs.

PCT 2nd Written Opinion in PCT Application No. PCT/US2015/022887, dated Jan. 7, 2016, 5 pgs.

PCT International Search Report & Written Opinion Issued in PCT Application No. PCT/US2015/022886, dated Aug. 31, 2015, 17 Pages.

Ribbon Layout and Resizing, Retrieved on: Mar. 12, 2014, Available at: http://msdn.microsoft.com/en-us/library/ff701790(v=vs.110).aspx, 5 pgs.

Scarr, Joey et al., "Improving Command Selection with Command Maps", In Proceedings of the SIGCHI Conference on Human Factors in Computing Systems, Austin, TX, May 5-10, 2012, pp. 257-266.

The Ribbon Bar, Published on: Dec. 1, 2012, Available at: http://bioinf.scri.ac.uk/tablet/help/ribbon.shtml, 3 pgs.

UI Element Guidelines: Menus, Published on: Sep. 26, 2011, Available at: https://developer.apple.com/library/mac/documentation/userexperience/conceptual/applehiguidelines/Menus/Menus.html, 22 pgs.

U.S. Appl. No. 14/254,681, Notice of Allowance dated Jan. 11, 2016, 9 pgs.

U.S. Appl. No. 14/254,681, Notice of Allowance dated Dec. 4, 2015, 10 pgs.

U.S. Appl. No. 14/338,078, Office Action dated Jun. 16, 2016, 19 pgs.

* cited by examiner

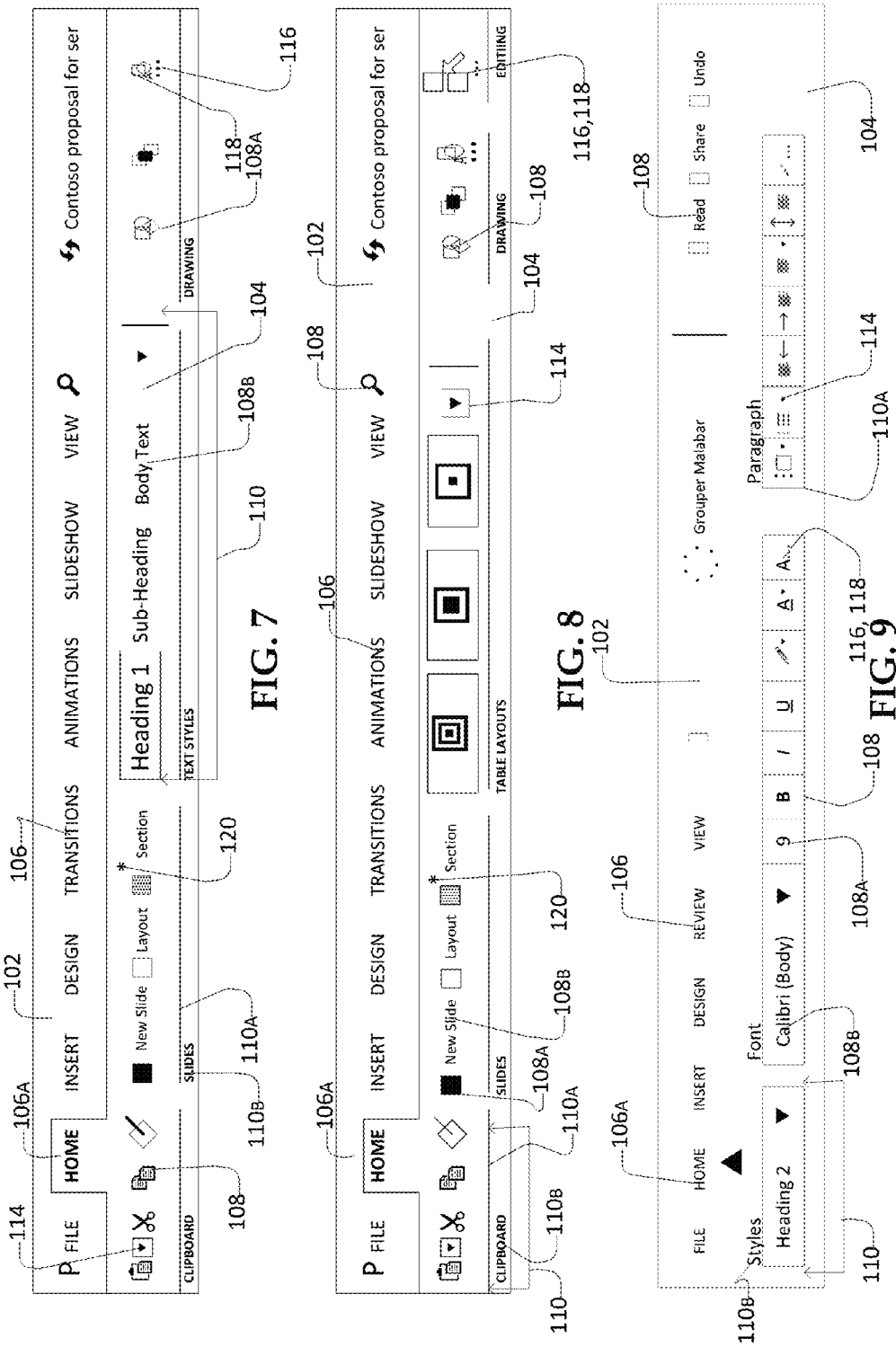

COMMAND USER INTERFACE FOR DISPLAYING AND SCALING SELECTABLE CONTROLS AND COMMANDS

CROSS REFERENCE TO RELATED APPLICATIONS

This application claims priority to U.S. patent application Ser. No. 14/254,681, filed Apr. 16, 2014, titled "COMMAND USER INTERFACE FOR DISPLAYING AND SCALING SELECTABLE CONTROLS AND COMMANDS," now issued U.S. Pat. No. 9,329,761, which claims the benefit of U.S. Provisional Patent Application No. 61/973,729, filed Apr. 1, 2014, titled "COMMAND USER INTERFACE FOR DISPLAYING AND SCALING SELECTABLE CONTROLS AND COMMANDS," the entire contents of which are hereby incorporated herein by reference.

BACKGROUND

Computer and software users have grown accustomed to user-friendly software applications that help them write, calculate, organize, prepare presentations, send and receive electronic mail, make music, and the like. For example, word processing applications allow users to prepare a variety of useful documents. Spreadsheet applications allow users to enter, manipulate, and organize data. Electronic slide presentation applications allow users to create a variety of slide presentations containing text, pictures, data or other useful objects.

To assist users to locate and utilize commands of a given software application, a user interface containing a plurality of command controls is typically provided along an upper, lower or side edge of a displayed workspace in which the user may enter, copy, manipulate and format text or data. Such commands often include selectable buttons with such names as "file," "edit," "view," "insert," "format," and the like. Typically, selection of one of these top-level buttons, for example "format," causes a drop-down menu or a bar to be deployed to expose one or more selectable controls associated with the top-level buttons, for example "font" under a top-level functionality of "format." However, as computing devices decrease in size, so too does the amount of screen space available for the display of the workspace, controls, and commands.

It is with respect to these and other general considerations that embodiments have been made. Also, although relatively specific problems have been discussed, it should be understood that the embodiments should not be limited to solving the specific problems identified in the background.

SUMMARY

In summary, the disclosure generally relates to an improved user interface for displaying and scaling selectable controls and/or commands within at least one ribbon. More particularly, the disclosure relates to granular scaling of software commands and/or controls displayed in at least one of a first and second ribbon to accommodate different window sizes, device sizes, or a change in window or device size.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive embodiments are described with reference to the following Figures in which:

FIG. 7 illustrates an exemplary portion of a graphical interface of a software application displaying a first ribbon and a second ribbon, according to another example embodiment;

FIG. 8 illustrates an exemplary portion of a graphical interface of a software application displaying a first ribbon and a second ribbon, according to yet another example embodiment;

FIG. 9 illustrates an exemplary portion of a graphical interface of a software application displaying a first ribbon and a second ribbon, according to still another example embodiment;

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present disclosure is defined by the appended claims and their equivalents.

As briefly described above, embodiments of the disclosure are directed to an improved graphical interface. As discussed above, smaller and smaller computing devices are being designed and utilized. As computing devices decrease in size, so too does the size of their display screens. Accordingly, the windows displaying the software applications are also small in size. The small windows provide less space to display the workspace (also referred to as a "canvas") and selectable commands and controls.

To address the above limitations, embodiments of the disclosure relate generally to methods and systems for an improved graphical interface. The improved user interface displays and granularly scales selectable software commands and controls within a silhouette based on the size of the window displaying the software application or a change in the size or orientation of the window.

Figure 1:
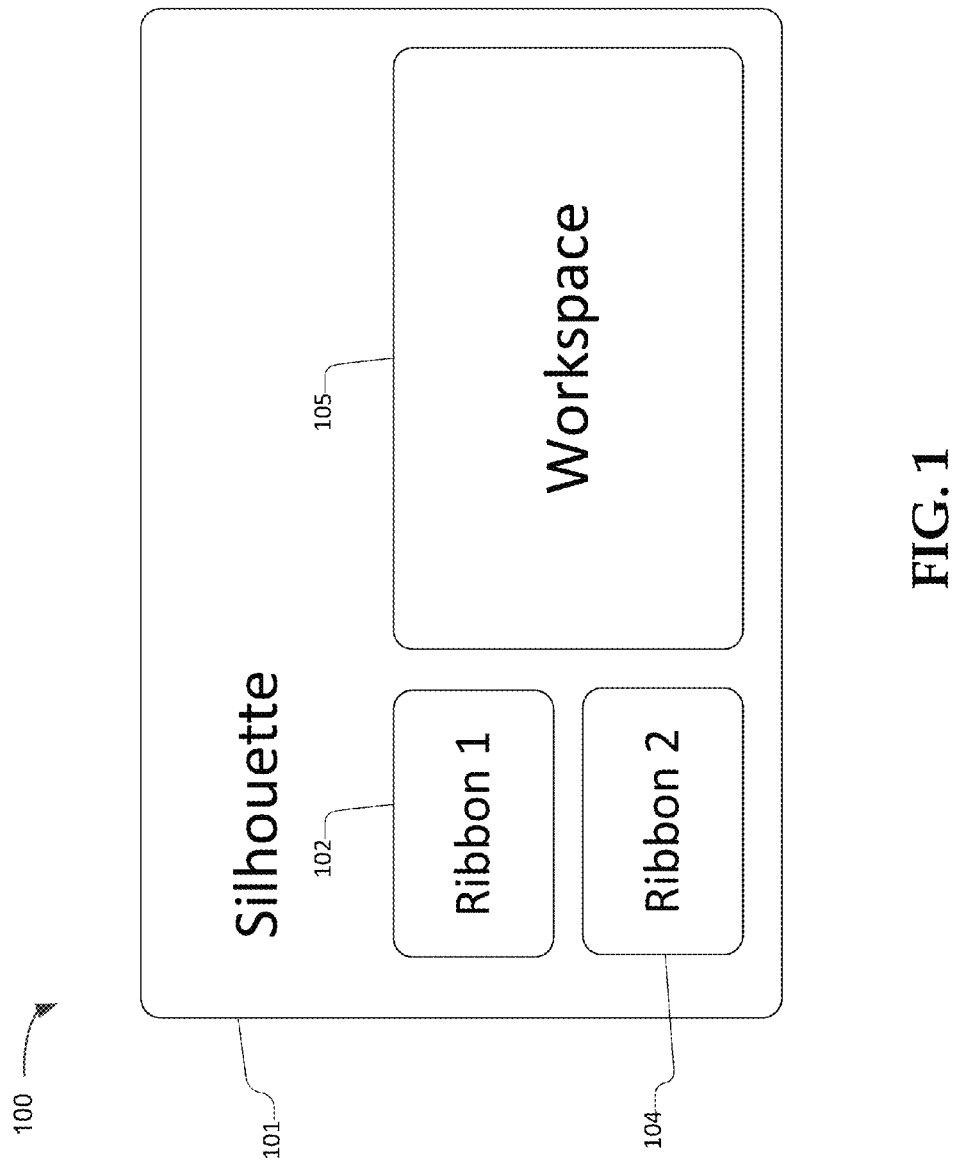
FIG. 1 illustrates an exemplary schematic diagram of a graphical interface of a software application for displaying a silhouette, according to an example embodiment.

FIG. 1 illustrates an exemplary schematic diagram for a silhouette 100 of a software application (also referred to herein as "application" or "app."). The silhouette 100 is a background landscape for an application in the form of a user interface displaying one or more selectable functional commands and/or controls in-line with one or more informational portions. The silhouette 100 includes a frame 101 that defines the outer perimeter of the window displaying the application. Within the frame 101, the silhouette 100 further includes at least one ribbon and a workspace 105. In some embodiments, the frame 101 within the silhouette 100 includes a first ribbon 102 and second ribbon 104. The workspace 105 is an area or a space displayed within the application where objects are created and edited. Each ribbon 102, 104 is a designated area or space displayed within the frame 101 that organizes and provides commands and/or controls for selection by the user of the application. In some embodiments, the ribbons 102 and 104 are located above the workspace 105. In other embodiments, the ribbons 102 and 104 are located to left, right or below the workspace 105. In yet other embodiments, the first ribbon 102 and the second ribbon 104 are located on different sides of the workspace 105.

Figure 2:
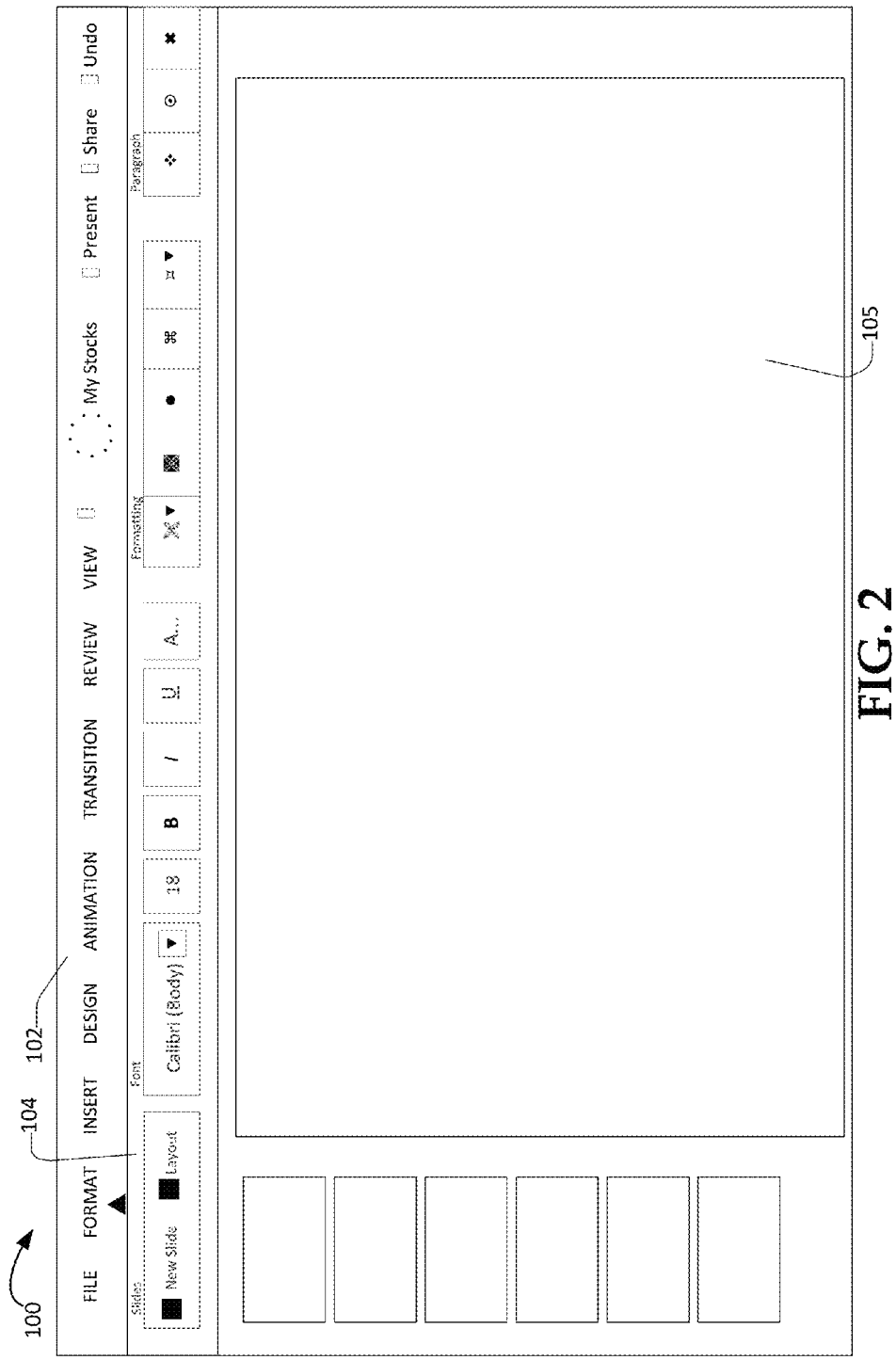
FIGS. 2-3 illustrate exemplary graphical interfaces of a first software application for displaying a silhouette, according to example embodiments.
Figure 3:
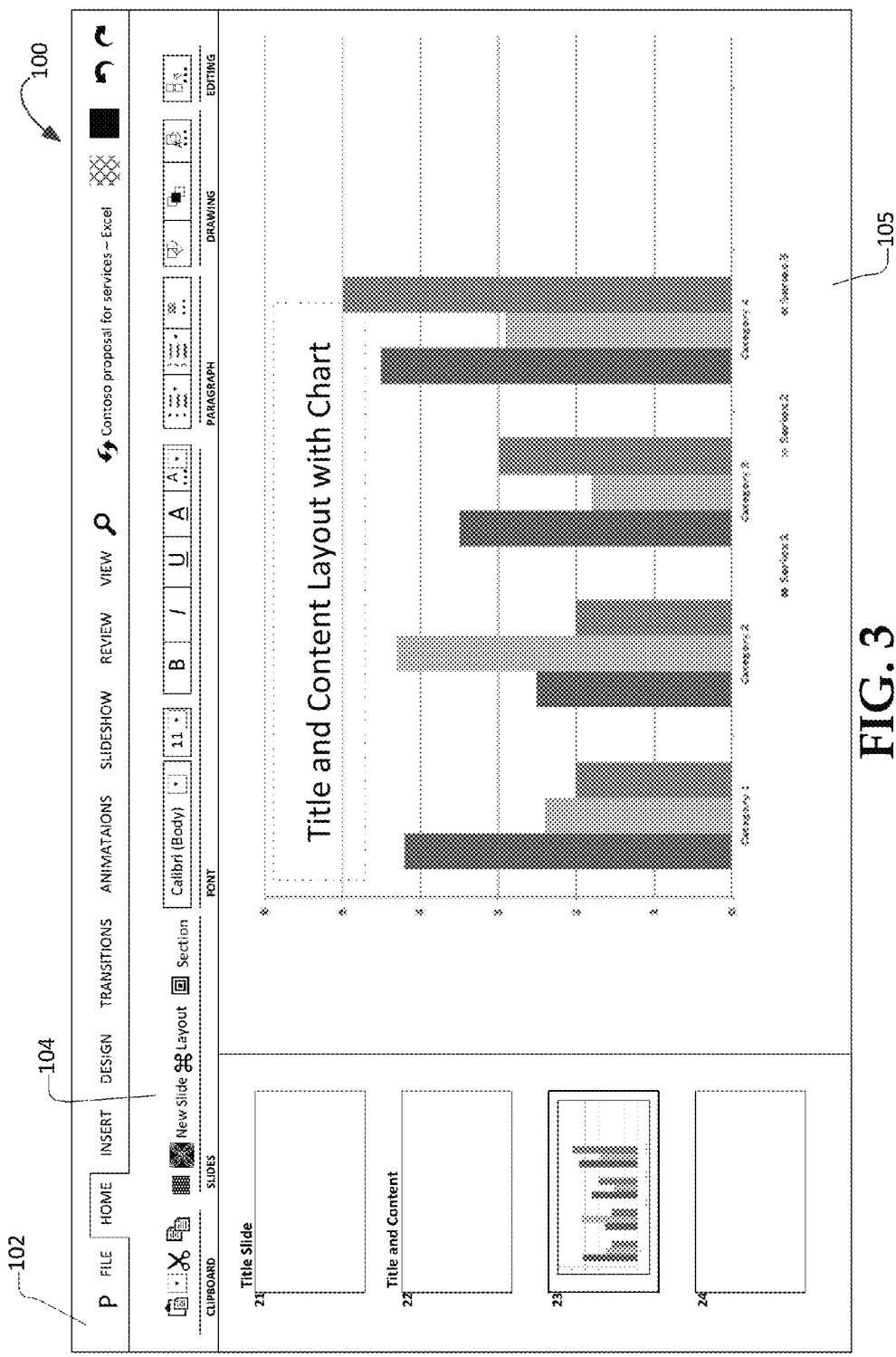
Figure 4:
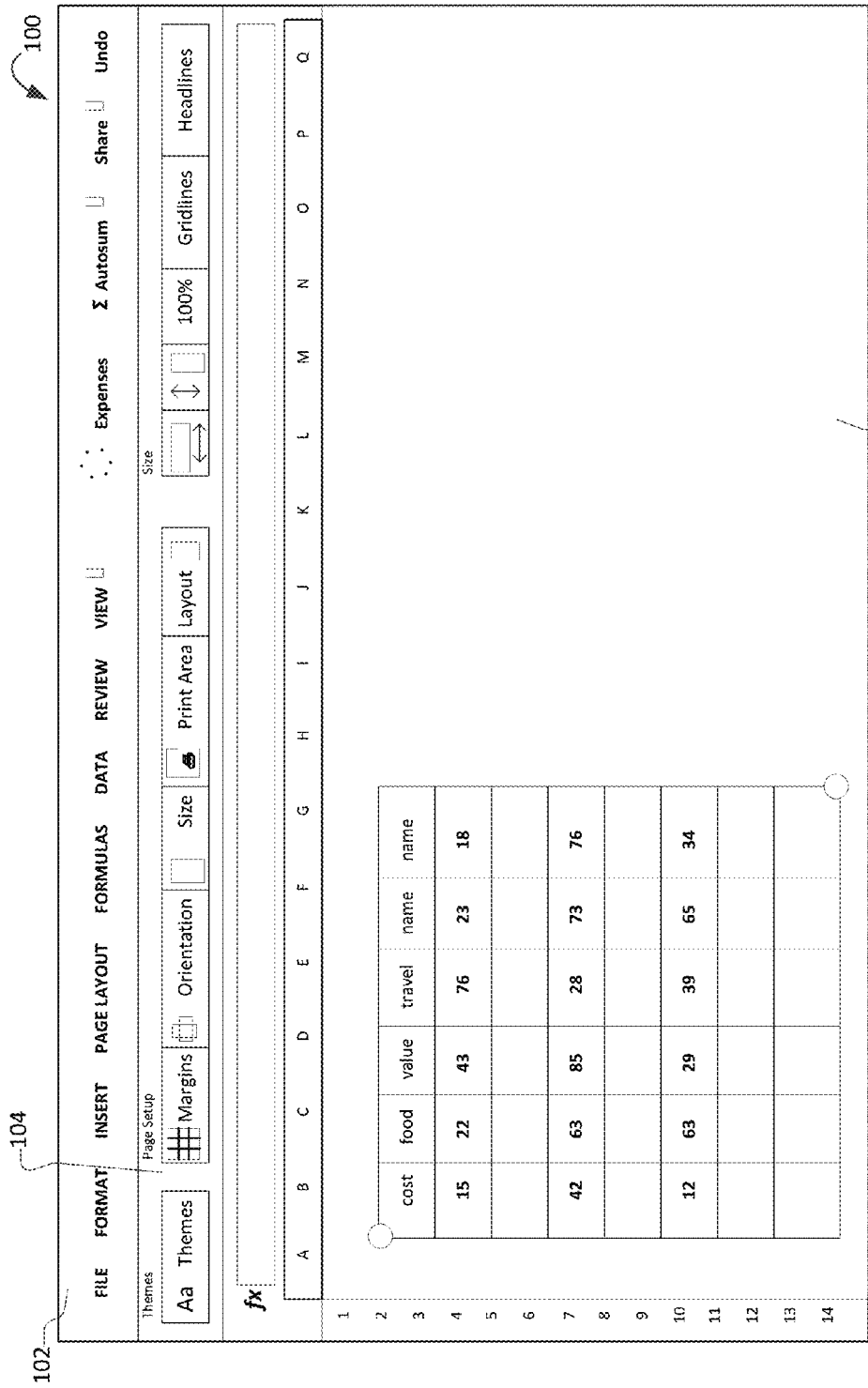
FIGS. 4-5 illustrate exemplary graphical interfaces of a second software application for displaying a silhouette, according to example embodiments.
Figure 5:
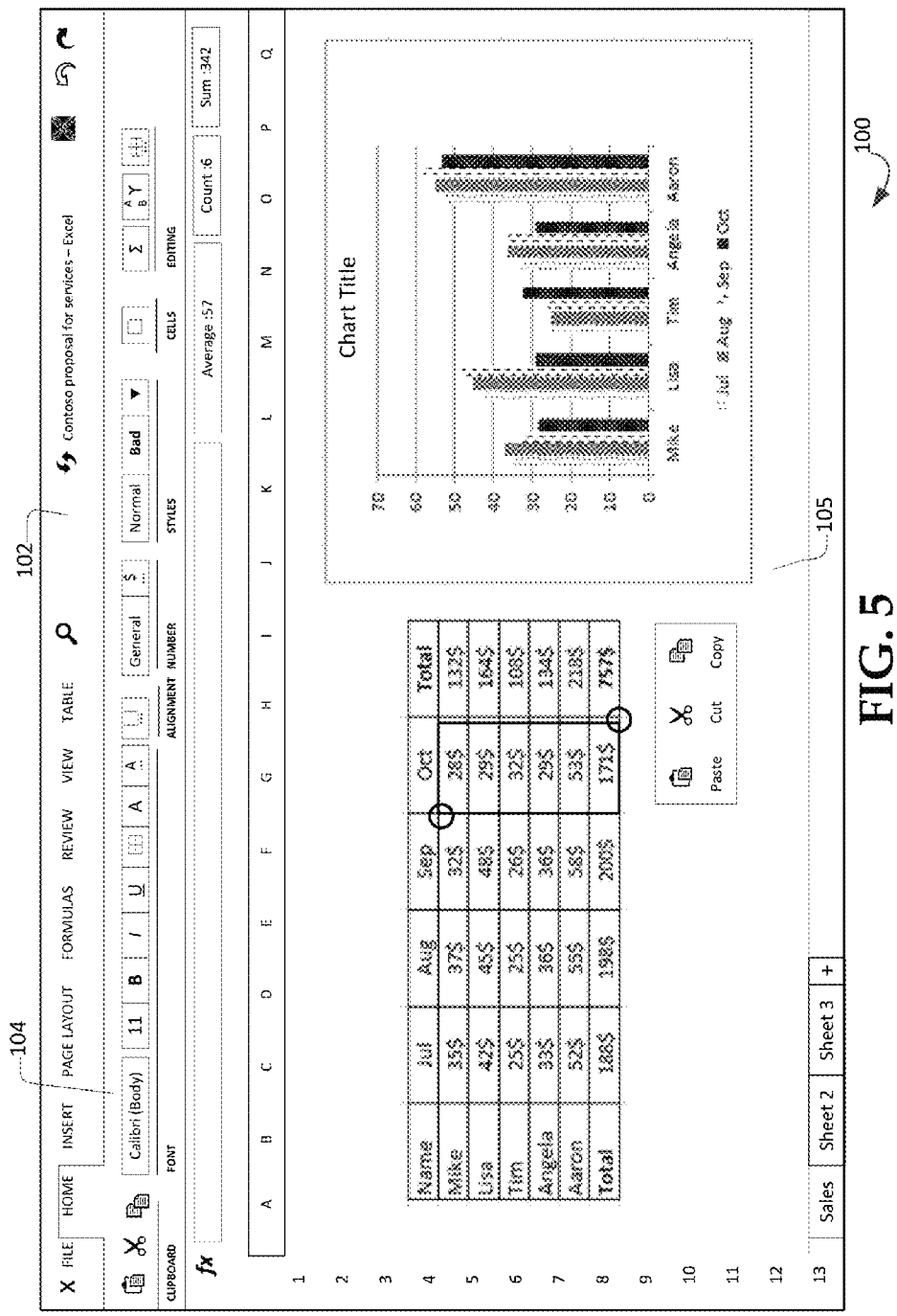
Figure 6:
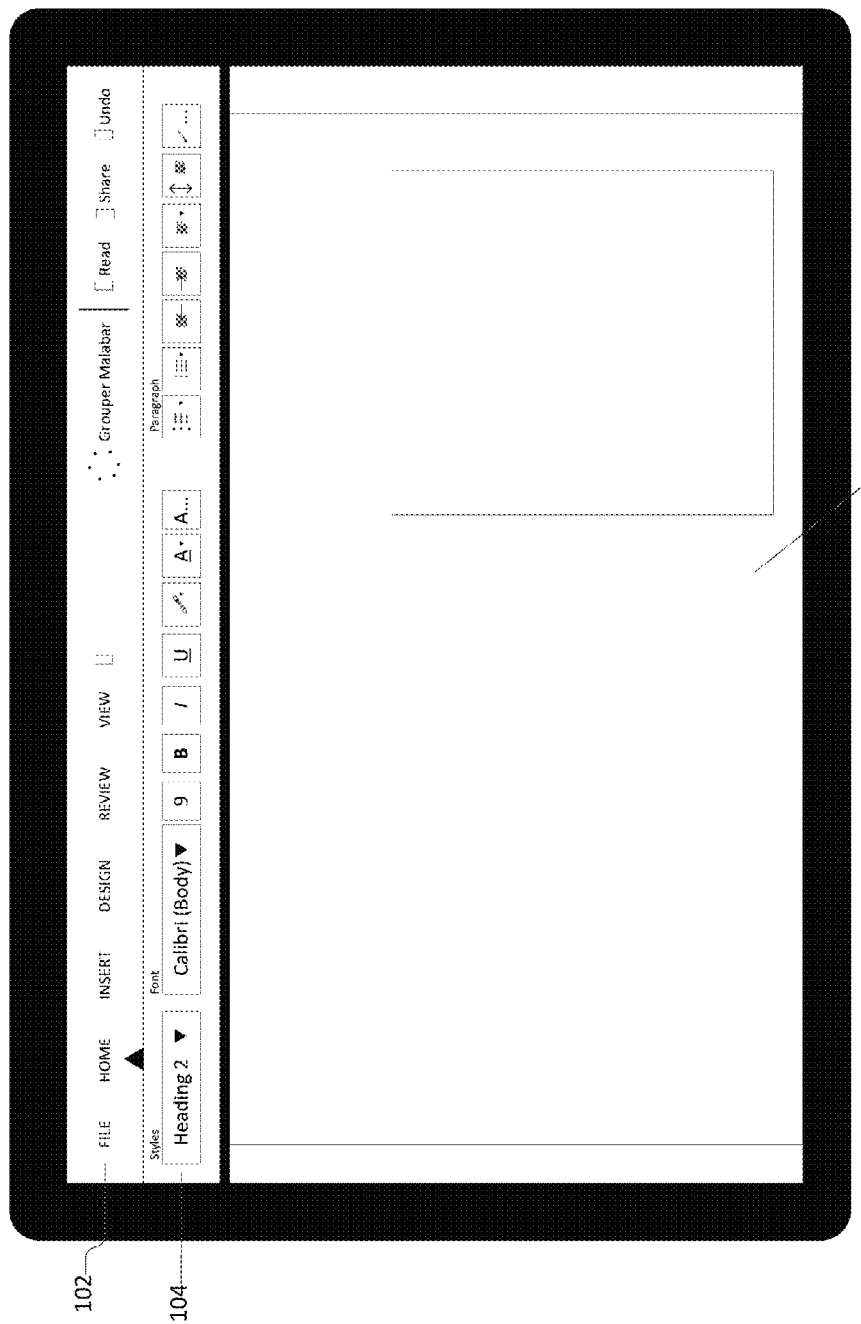
FIG. 6 illustrates an exemplary graphical interface of a third software application for displaying a silhouette on a tablet computer, according to another example embodiment.

The exemplary graphical interfaces illustrated in FIGS. 2-6 display various silhouettes 100 for various software applications. FIGS. 2 and 3 illustrate two different exemplary silhouettes 100 for a slide presentation application. FIGS. 2 and 3 show two examples of two different graphic interfaces for a slide presentation application. FIGS. 4 and 5 illustrate two different exemplary silhouettes 100 for a spreadsheet application. FIGS. 4 and 5 show two examples of two different graphic interfaces for a spreadsheet application. FIG. 6 illustrates an exemplary silhouette 100 for a word processing application being executed by a tablet.

FIGS. 7-9 illustrate exemplary first and second ribbons 102, 104 of a silhouette 100 for various software applications.

FIGS. 7 and 8 illustrate two different exemplary first and second ribbons 102, 104 for a slide presentation application. FIGS. 7 and 8 show how different selectable controls 102 can be ordered and displayed for the same window size for a slide presentation application. FIG. 9 illustrates an exemplary first and second ribbon 102, 104 for a word processing application. The first ribbon 102 and second ribbon 104 organize a plurality of commands and controls 108 that are available for selection by the user. The first ribbon 102 displays one or more tabs 106. Each tab 106 identifies different groupings of selectable controls and/or commands 108. In some embodiments, the selectable controls 108 are grouped according to the tasks performed by the selectable controls 108. The second ribbon 104 groups the selectable controls 108 according to the given tabs 106. The second ribbon 104 further organizes the selectable commands 108 for each tab 106 into subgroups referred to herein as chunks 110. Accordingly, each selectable control is associated with or organized under a tab 106 and a chunk 110. In some embodiments, one or more selectable commands 108 are displayed in the first ribbon 102. However, depending upon the size of the window of the application, there may not be enough space to display each selectable command 108 associated with a tab, or display each tab 106 for the application. Further, selectable commands and/or controls 108 within the first ribbon 102 and the second ribbon 104 need to compatible for use with user selections made via a mouse, keyboard, pen, pointer, and/or a touch-sensitive screen.

As such, the software application executed by the computing device calculates a layout for the silhouette 100. A calculated layout is displayed by the silhouette 100 of the software application. In order to calculate the appropriate layout for the silhouette 100, the application has to identify the current window size of the application. Identifying the window size of the application includes identifying a change in the window size of the application. A window may change in size due to user selection (such as resizing of the window), based on a change of display screen for the computing device (such as changing from one monitor to a monitor of a different size), a change in device orientation between portrait and landscape, or based on a change in computing device. In smaller computer devices (such as phones, tablets, watches, and etc.), the window size of the application may correspond to the size and/or orientation of the display screen.

Figure 11:
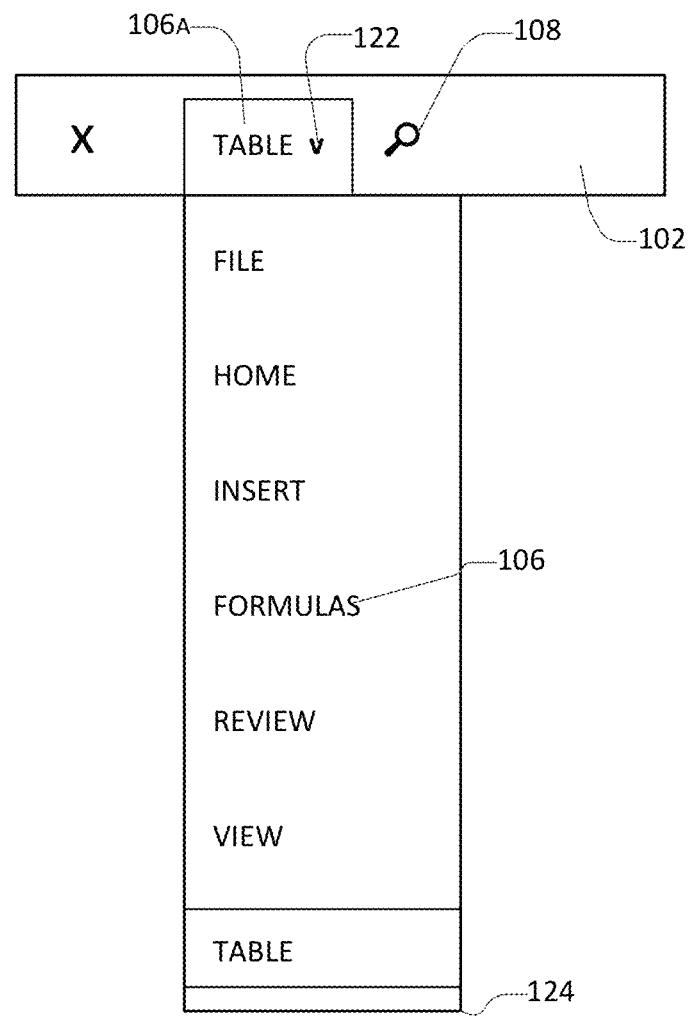
FIG. 11 illustrates exemplary portion of a graphical interface of a software application displaying a portion of a first ribbon and a tab callout, according to another example embodiment.
Figure 12:
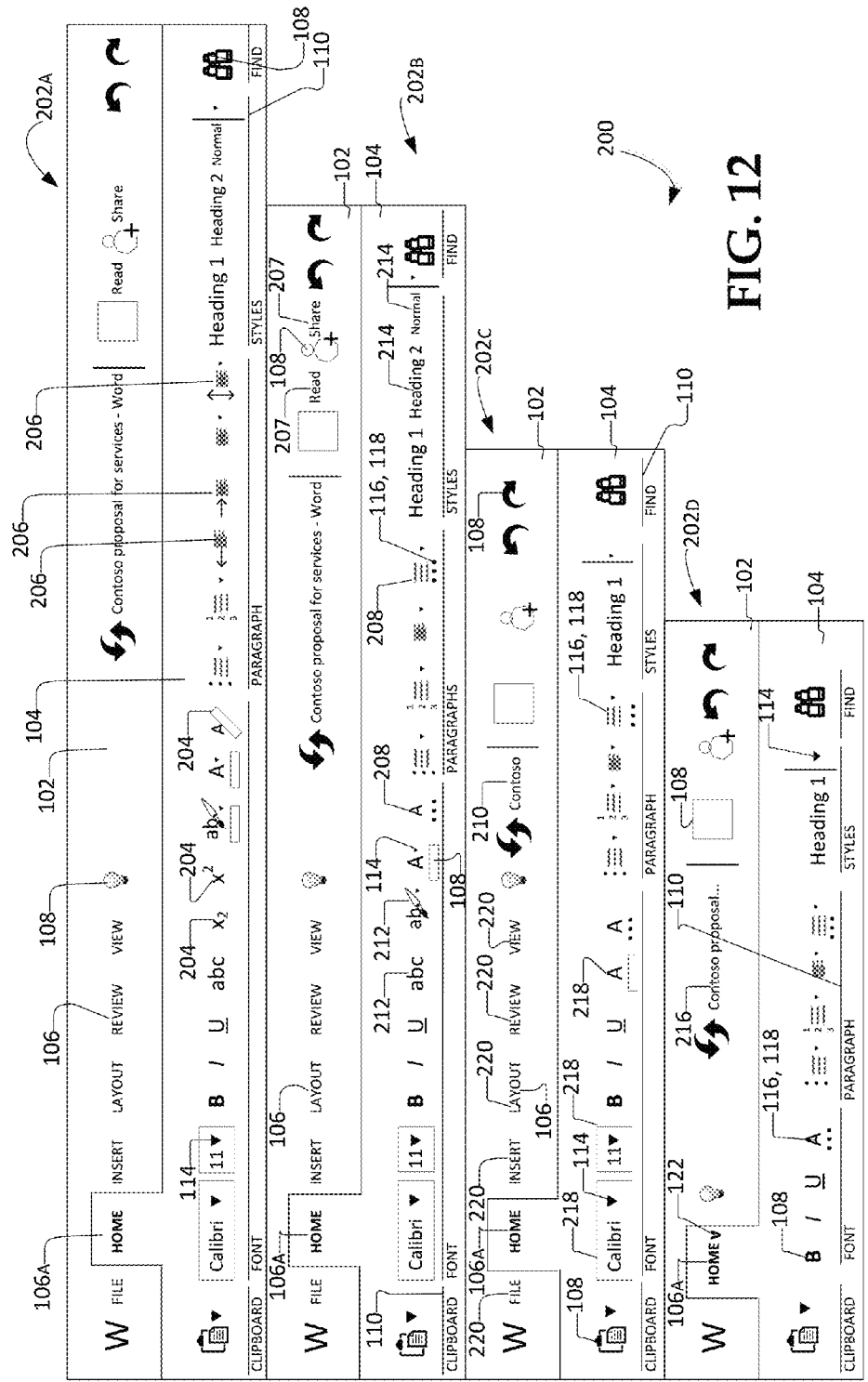
FIG. 12 illustrates exemplary scaling of exemplary first and second ribbons of a silhouette for a software application, according to another example embodiment.

FIG. 12 illustrates exemplary scaling 200. The scaling 200 illustrates a plurality of different exemplary layouts 202 for a first and second ribbon 102, 104 for various window sizes. As illustrated in FIGS. 2-12, the first ribbon 102 displays at least the designated tab 106a. The designated tab 106a is a tab 106 that has been selected by a user or is a default tab automatically selected by the application. The second ribbon 104 displays at least a portion of the selectable controls 108 associated with the designated tab 106a. Upon receiving an indication of a selection of another tab 106 by the user, the second ribbon 104 displays at least a portion of the selectable control 108 associated with the newly designated tab 106a. Any selectable control 108 that could be displayed by the second ribbon 104 is referred to herein as a potential display control.

Figure 10:
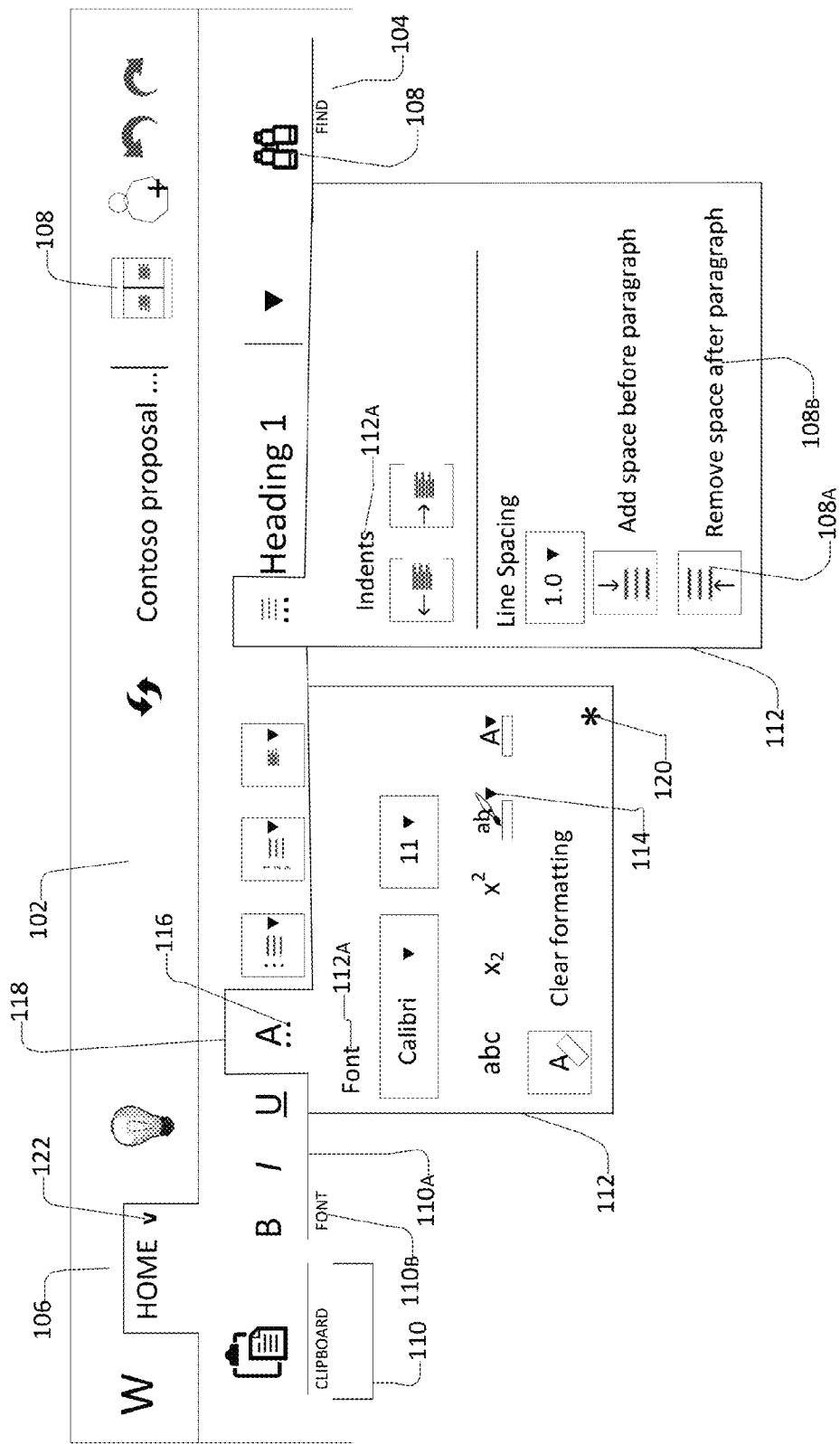
FIG. 10 illustrates an exemplary portion of a graphical interface of a software application displaying a first ribbon, a second ribbon, and two different hidden overflow panes, according to another example embodiment.

In some embodiments, a portion of the selectable controls 108 associated with a tab 106 are never displayed on the second ribbon 104 and are instead stored within a pop-up flyout that is only displayed upon selection of an expand button 120 as illustrated in FIGS. 7, 8, and 10. A selectable control 108 that is never displayed by the second ribbon 104 is referred to herein as a concealed control. In some embodiments, a developer of the software application determines the concealed controls and the potential display controls. In some embodiments, the user of an application can modify which selectable controls 108 are the concealed controls and the potential display controls. In some embodiments, any chunk 110 that includes concealed controls includes and displays an expand button 120 that is associated with that chunk. The software application, upon receiving an indication of a user selection of the associated expand button 120, displays the pop-up flyout associated with that chunk to display the concealed controls associated with that chunk. In other embodiments, any chunk 110 that includes concealed controls includes and displays an expand button 120 in an overflow pane 112 that is associated with that chunk. The overflow pane 112 is discussed in more detail below.

In some embodiments, a portion of the potential display controls within a chunk 110 are placed into micro-groups. In some embodiment, the selectable controls 108 within a micro-group are different for the same command. For example, different available fonts for a change in font may be listed within a micro-group. Alternatively, uncommonly utilized fonts may be concealed controls and not displayed within the micro-group in the second ribbon 104. These micro-groups are identified and accessible from the second ribbon 104 via an unfold button 114 associated with a specific selectable control as illustrated in FIGS. 7-9. Any selectable control 108 that includes a micro-group includes and displays an unfold button 114 that is associated with that selectable command. The software application, upon receiving an indication of a user selection of the unfold button 114, displays the command callout associated with the specific selectable control to display the micro-group selectable commands associated with that selectable control 108.

A specific layout 202 (e.g., one of the layouts shown in FIG. 12) is calculated by utilizing a priority list. In some embodiments, the priority list identifies what tabs 106 and/or potential display controls 108 are displayed in the first ribbon 102 and/or the second ribbon 104 for various potential application window sizes. The priority list calculates scaling for any potential window size. In some embodiments, the priority list calculates scaling for any potential window size up to a predetermined maximum window size and/or down to a predetermined minimum window size. In further embodiments, the window size is calculated and/or identified by the priority list along with scaling. In some embodiments, the priority list may cache or save some layouts that have already been computed for a certain device, (e.g. full screen landscape, full screen portrait), but the scaling logic utilized by the priority list does not have to rely on these saved layouts.

A tab 106, a selectable control 108, a chunk 110, button, and/or other items may be displayed or designated utilizing a graphical representation and/or a textual representation. In some embodiments, the priority list further identifies whether the tab 106, chunk 110, selectable control 108, button, and/or other items should change in size based on an identified window size. In additional embodiments, the priority list further identifies whether the spacing between a tab 106, chunk 110, selectable control 108, button, and/or another item should change in size based on an identified window size. In further embodiments, the priority list further identifies if both a graphical representation and a textual representation should be displayed or if only one of a graphical representation and a textual representation should be displayed for a tab 106, chunk 110, selectable control 108, and/or other item. In some embodiments, the priority list further identifies if a graphical representation and a textual representation should be reduced in size or if a graphical representation should be truncated or cut-off for a tab 106, chunk 110, selectable control 108, and/or other item.

FIGS. 7-9 illustrate tabs 106 utilizing textual representations. FIG. 8 illustrates a selectable control 108 that is represented both with a graphical representation 108a and a textual representation 108b. FIGS. 7 and 9 illustrate a selectable control 108 that is represented with only a graphical representation 108a. FIG. 7 illustrates a selectable control 108 that is represented with only a textual representation 108b. FIGS. 7-9 illustrate chunks 110 that are represented with both graphical representation 110a and a textual representation 110b.

In some embodiments, the layout 202 is calculated by identifying selectable controls 108 for display from potential display controls associated with a designated tab 106a by correlating the determined size of the application window to the priority list. Accordingly, identified potential selectable controls are selectable controls 108 displayed on the second ribbon 104 and potential selectable controls that are not identified by the priority list when calculating the layout are hidden within an appropriate overflow pane 112. In further embodiments, the layout 202 is calculated by moving a subset of the potential display controls within at least one of the chunks 110 between a specific chunk displayed on the second ribbon 104 that includes the subset to a hidden overflow pane associated with the specific chunk. Accordingly, in some embodiments, the priority list based on the identified window size may require that the subset of two or more selectable controls in a first chunk that were previously being displayed be moved into a hidden overflow pane associated with the first chunk. Upon further reductions in window size, in some embodiments, each newly calculated layout based on the priority list using scaling logic moves at least one additional subset of selectable controls from one or more chunk(s) previously displayed on the second ribbon 104 to the one or more hidden overflow pane(s) associated with the appropriate chunk(s). In contrast, for each increase in window size, in further embodiments, each newly calculated layout based on the priority list using scaling logic moves at least one additional subset of selectable controls from one or more overflow pane(s) that were previously hidden to the one or more appropriate chunk(s) for display on the second ribbon 104.

FIG. 10 illustrates an exemplary embodiment of a portion of a silhouette 100 displaying a first ribbon 102, a second ribbon 104, and an overflow pane 112 (also referred to herein as a "hidden overflow pane"). The overflow pane 112 is referred to as hidden because the pane 112 is not displayed by the second ribbon 104 until an indication of selection of the overflow button 118 is received by the application. The hidden overflow pane 112 is a pane or area that includes a list of the selectable controls 108 that would be displayed in the second ribbon 104 if the window size of the application was larger. In other words, any potential display control that cannot be displayed in the second ribbon 104 based on the size of the window is listed or moved into the overflow pane 112. Each overflow pane 112 is associated with a specific chunk 110. A layout that removes a selectable control from display in a first chunk on the ribbon moves the control to a first overflow pane associated with the first chunk. Accordingly, a layout that removes a first selectable control and a second selectable control from display in a first chunk and removes a third selectable control from display in a second chunk, places the first selectable control and the second selectable control in a first overflow pane associated with the first chunk and places the third selectable control in a second overflow pane associated with the second chunk. In some embodiments the overflow pane 112 includes a pane identifier 112a. In some embodiments, the pane identifier 112a identifies the chunk associated with the overflow pane 112.

The second ribbon 104 displays an overflow indicator 116 within the chunk 110 when any potential display control associated with that chunk 110 is placed in the hidden overflow pane 112. The overflow indicator 116 signifies to the user that some of the potential display controls have been moved to the overflow pane 112. In some embodiments, the overflow indicator 116 is graphical representation and/or a textural representation. In further embodiment, the overflow indicator 116 is also an overflow button 118. In alternative embodiments, the overflow indicator 116 is separate from and different than the overflow button 118.

Additionally, in some embodiments, selectable controls listed in the overflow pane 112 are ordered or organized for user convenience. For example, in some embodiments, a first overflow pane associated with a first chunk displays any selectable control listed in the pane in a way that is similar to or identical to an order displayed in the first chunk. Further, this order is maintained regardless of the order by which the selectable controls 108 are removed from the first chunk. For example, if the first chunk lists six different selectable controls (A, B, C, D, E, and F) displayed as shown below:

*ABC*

*DEF* and B and E are moved from the first chunk to a first overflow pane 112 associated with the first chunk, the first overflow pane 112 displays B and E as shown below:

*B*

*E* which is similar to how B and E are displayed in the first chunk before being moved into the first overflow plane. In this same example, if selectable control A is then moved from the first chunk to the first overflow pane 112, the first overflow pane 112 displays A, B, and E as shown below:

*AB*

*E* to maintain the same or similar feel to the display of the first chunk within the second ribbon in the first overflow pane. In another example, the overflow pane 112 maintains the same order of the selectable controls as displayed in the second ribbon regardless of the orientation of the overflow pane (vertical or horizontal). For example, based on the previous examples, in these embodiments, if B and E are moved from the first chunk to a first overflow pane 112 associated with the first chunk, the first overflow pane 112 displays B and E as shown below:

*BE,* or

*B*

*E* which is the same order that B and E are displayed in the first chunk before being moved into the first overflow plane. In this same example, if selectable control A is then moved from the first chunk to the first overflow pane 112, the first overflow pane 112 displays A, B, and E as shown below:

*ABE,* or

*A*

*B*

*E* to maintain the same order of the selectable controls as was displayed by the first chunk within the second ribbon in the first overflow pane.

In some embodiments, the layout 202 is calculated by identifying tabs 106 for display from potential tabs by correlating the size of the software application window to a tab rank list within the priority list. The potential tabs are any selectable tab 106 that could be displayed by the first ribbon 102. These embodiments may further include moving at least one potential tab between a listing on the first ribbon 102 and a hidden tab callout 124 associated with the first ribbon 102. FIG. 11 illustrates an exemplary portion of a graphical interface of a software application displaying a portion of a first ribbon 102 and a tab callout 124 associated with the first ribbon 102. The tab callout 124 is referred to as hidden because the tab callout 124 is not displayed by the first ribbon 102 unless an indication of a selection of a spillover button 122 is received by the application. The spillover button 122 is displayed by the first ribbon when any tab is moved from the first ribbon 102 to a tab callout 124. In some embodiments, in addition to the spillover button 122, a spillover indicator is displayed by the first ribbon to inform the user that at least a portion of the tabs are now listed in the tab callout 124. The spillover button 122 is a button selected by a user to display tab callout 124. The spillover indicator is a graphical and/or textual representation that informs the user that at least a portion of the tabs are now located within the tab callout 124 instead of displayed on the first ribbon 102. In some embodiments, the spillover button 122 is also the spillover indicator. In alternative embodiments, the spillover indicator is different and separate from the spill over button 122.

In some embodiments, the layout 202 is calculated by identifying selectable controls that can be condensed into micro-groups or moving entire micro-groups into the overflow pane 112 by correlating the size of the software application window to a micro-group rank list within the priority list. In some embodiments, each command within the micro-group is displayed as a selectable command within the overflow pane 112. In other embodiments, a selectable command and the unfold button 114 for a micro-group are displayed in the overflow pane 112. In some embodiments, the layout 202 is calculated by identifying all of the expand buttons 120 and moving a portion of the expand buttons between being displayed within their associated chunks on the second ribbon 104 and being listed within the appropriate overflow panes 112 by correlating the size of the software application window to an expand button rank list within the priority list.

In some embodiments, the layout 202 is calculated by identifying if only one ribbon should be displayed. In these embodiments, the priority list utilizing scaling logic based on the identified window size calculates if the first ribbon 102 and the second ribbon 104 should be condensed into one ribbon or if both the first ribbon 102 and second ribbon 104 should be displayed. In instances of limited window size, the priority list calculates a layout in which the first ribbon 102 and the second ribbon 104 are condensed into one ribbon for display.

Previous attempts at scaling the silhouette were limited in nature. For example, previous scaling was limited to the chunk level. For instance, previous scaling required an entire chunk to be display or condensed. Further, previous scaling did not allow only a subset of the selectable controls displayed within a chunk to be scaled down. Additionally, previous silhouette scaling did not allow a first selectable control from a first plurality of selectable controls on a first chunk along with a second selectable control from a second plurality of selectable controls of a second chunk to each fall off at the same time or consecutively as window size decreases. Accordingly, the systems and methods of the disclosure provide for granular scaling of the silhouette and allow a subset of the selectable controls displayed within a chunk to be scaled down by utilizing a priority list with scaling logic. Additionally, the systems and methods of the disclosure allow a first selectable control from a first plurality of selectable controls on a first chunk along with a second selectable control from a second plurality of selectable controls of a second chunk to each fall off at the same time or consecutively as the window size decreases based on the priority list. The priority list allows a developer of a software application to order in detail the following parameters:

1) each of the selectable controls associated with each of the tabs for overflow;
2) each tab for overflow;
3) each ribbon for display;
4) the formation and positioning of micro-groups;
5) expand buttons;
6) the sizing of items (selectable controls, tabs, chunks, buttons, micro-groups, identifiers, textual representations, graphical representations, ribbons, and etc.);
7) the spacing between items;
8) the display representation (i.e., textual representation and/or graphic representation) for displayed items; and
9) truncation of textual representations, for scaling according to various potential window sizes for a software application. Further, the priority list orders when each of these parameters are utilized and may mix and match different parameters interchangeably for different window sizes. Moreover, it is understood by a person of skill in the art that the priority list may be designed to scale any number of ribbons (first ribbon, second ribbon, . . . $n^{th}$ ribbon), selectable controls (first control, second control, . . . $n^{th}$ control), selectable commands (first command, second command, . . . $n^{th}$ command), tabs (first tab, second tab, . . . $n^{th}$ tab), identifiers (first identifier, second identifier, . . . $n^{th}$ identifier), buttons (first button, second button, . . . $n^{th}$ button), chunks (first chunk, second chunk, . . . $n^{th}$ chunk), micro-group (first micro-group, second micro-group, . . . $n^{th}$ micro-group) or other items displayed within the first or second ribbon.

For example, in one embodiment, in response to a reduction in window size, three different selectable parameters in three different chunks (a first chunk, a second chunk, and third chunk) may be reduced in size, while a micro-group is formed in a fourth chunk, and a selectable control in the first chunk is moved into a first overflow pane 112 associated with the first chunk. In this same embodiment, if another reduction in window size is identified, the calculated layout may move two selectable controls from the second chunk into a second overflow pane 112 associated with the second chunk and move one of the non-designated tabs into a callout window. These layouts are exemplary only and are not limiting. It is known by a person of skill in the art, the any order may be utilized by the priority list for any item or parameter.

In some embodiments, the user of an application can change the priority list for a software application. In these embodiments, upon an indication of selection of a reordering command by a user, the priority list is modified according to user preferences. In these embodiments, the layout is calculated utilizing the priority list as modified by the user.

As discussed above, FIG. 12 illustrates exemplary scaling 200 of an exemplary first ribbon 102 and second ribbon 104 of a silhouette 100 for a software application. The scaling 200 shows an embodiment of how a priority list could be used to scale down an exemplary first ribbon 102 and second ribbon 104 of a silhouette 100 due a decrease in the size of a word processing window. The priority list is part of the saved or downloaded software application. In some embodiments, the software application is saved on the computing device. In other embodiments, the software application is saved on a remote server.

The first layout 202a illustrated in FIG. 12 show the display of a first calculated layout for a first window size of 1600 pixels. The first ribbon 102 in the first layout 202a displays five different tabs 106 in addition to the designated tab 106a. The first ribbon 102 in the first layout also displays some selectable controls along with the saved name for the word processing document. The second ribbon 104 in the first layout displays a clipboard chunk, a font chunk, a paragraph chunk, a styles chunk, and a find chunk. The clipboard chunk displays one selectable control that includes a micro-group identified with a unfold button. The font chunk includes eleven different selectable controls, four of which have micro-groups identified with additional unfold buttons. The paragraph chunk displays six different selectable controls, four of which have micro-groups identified with additional unfold buttons. The styles chunk displays one selectable control that displays three commands of a micro-group along with another unfold button that includes the remaining commands of the micro-group. The help chunk displays one selectable control.

The second layout 202b illustrated in FIG. 12 show the display of a second calculated layout for a second window size of 1366 pixels. The first ribbon 102 in the second layout 202b is reduced in width but otherwise displays the same tabs and controls as displayed in the first layout 202a. The second ribbon 104 in the second layout 202b has also reduced in width but has undergone a few changes when compared to the first layout 202a. For example, the second layout 202b moved three selectable controls 204 in the font chunk to the font chunk overflow pane. Additionally, the second layout 202b moved three selectable controls 206 from the paragraph tab to the paragraph overflow pane. The font and paragraph chunks now each also display an overflow button 208, which is also the overflow identifier.

The third layout 202c illustrated in FIG. 12 shows the display of a third calculated layout for a third window size of 1024 pixels. The first ribbon 102 in the third layout 202c is reduced in width, but otherwise displays the same tabs and controls as displayed in the first layout 202a and second layout 202b. However, the third layout 202c when compared to the second layout 202b truncates or cuts-off the saved word document name 210 and includes an ellipse with the reduced width of the listed name. Further, the third layout 202c when compared to the second layout 202b removes two textual representations 207 each identifying different selectable controls along with two graphical representations on the first ribbon. Accordingly, these two selectable controls 207 are each only represented by the graphical representations in the third layout 202c, reducing the amount of space needed for displaying these selectable controls on the first ribbon 102. The second ribbon 104 in the third layout 202c has also reduced in width and has undergone a few more changes when compared to the second layout 202b. For example, the third layout 202c moved two more selectable controls 212 in the font chunk to the font chunk overflow pane. Additionally, the third layout 202c moved two of the controls 214 listed in the micro-group in the styles tab to the callout.

The fourth layout 202d illustrated in FIG. 12 shows the display of a fourth calculated layout for a fourth window size of 768 pixels. The first ribbon 102 in the fourth layout 202d is again reduced in width and, in comparison to the third layout 202c, has moved the non-designated tabs 220 to a tab callout 124 as identified by the spillover button 122. Accordingly, the first ribbon 102 only displays the designated tab based on this fourth layout 202d. Further, the saved word document name 216 has been partially expanded when compared to the third layout 202c thereby increasing the width of the listed name. The second ribbon 104 in the fourth layout 202d has also reduced in width and has undergone a few more changes when compared to the third layout 202c. For example, the fourth layout 202d moved three more selectable controls 218 along with their micro-groups in the font chunk to the font chunk overflow pane.

As discussed above, the selectable tabs, controls, buttons, and commands are selectable via a mouse, touchpad, pen, pointer, or keyboard. These applications identify a received selection regardless of the mode that the selection is received and responds by executing the selection. The scaling and sizing of the first ribbon, silhouette, second ribbon, workspace 105, selectable controls, tabs, buttons, micro-groups, and commands consider all of these modes of selection. Upon selection of a new tab, the second ribbon displays the portion of the selectable controls associated with the new tab based on the layout 202 calculated from the priority list for the new tab and identified window size. Additionally, receiving an indication of a selection of one of the selectable controls causes the software application to apply the control to an object in a workspace 105 of the software application.

The example systems in FIG. 2 through 12 have been described with specific configurations, applications, and interactions. Contemplated embodiments, however, are not limited to systems according to these examples. A system for providing a communication connection to establish a session between a client and a server and to exchange data over a network may be implemented in configurations that employ fewer or additional components and perform other tasks. Furthermore, although specific protocols have been described herein, one of skill in the art will appreciate that other protocols and/or interfaces may be employed with the embodiments disclosed herein.

Figure 13:
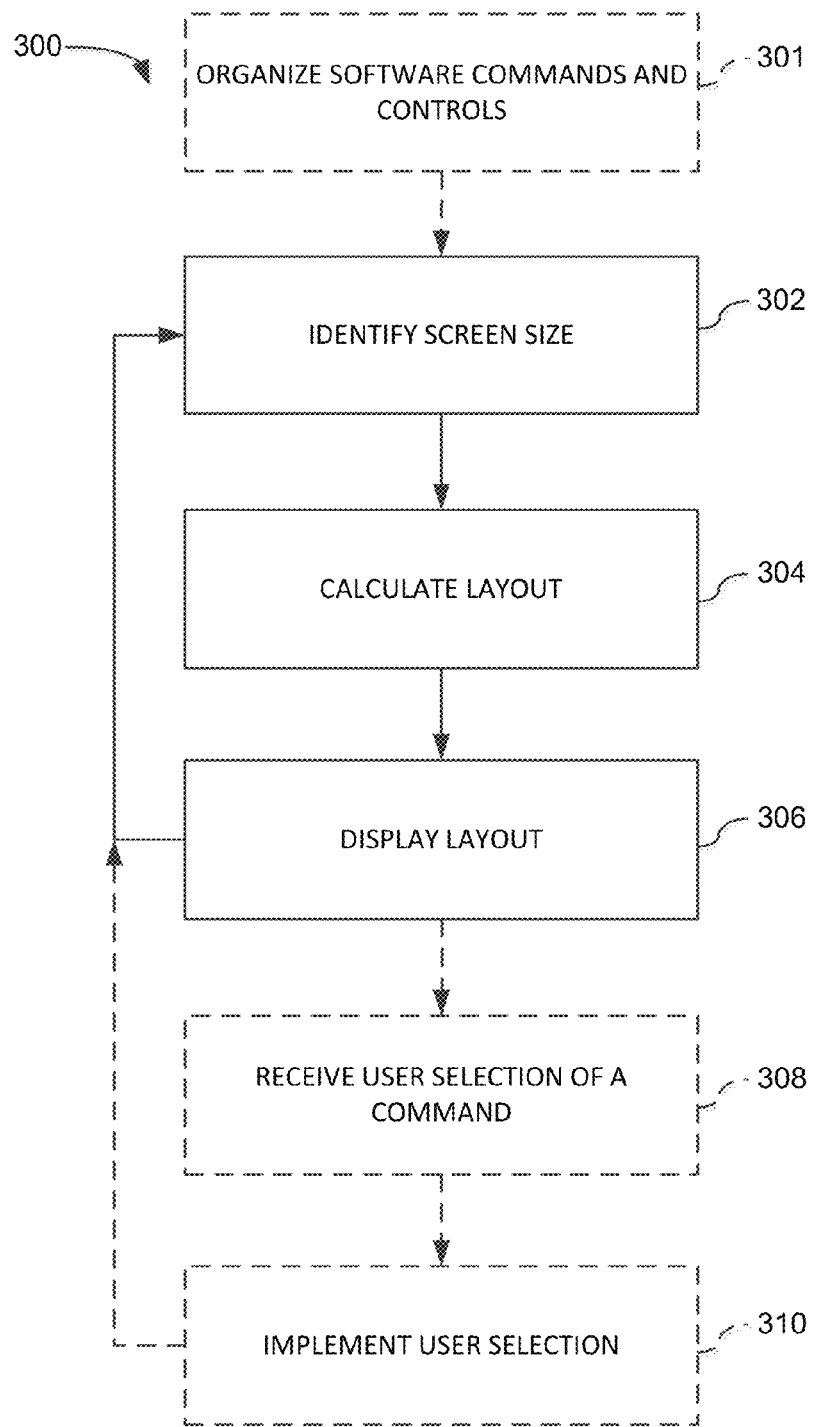
FIG. 13 illustrates an exemplary method for providing functionality from a software application by displaying and scaling an improved user interface at a display device, according to an example embodiment.

Referring now to FIG. 13, an exemplary method for providing functionality from a software application by displaying and scaling an improved user interface at a display device, according to an example embodiment is shown. The improved user interface displays and granularly scales a silhouette. Accordingly, the method 300 allows a subset of the selectable controls displayed within a chunk to be scaled down by utilizing a detailed priority list. Additionally, method 300 allows a first selectable control from a first plurality of selectable controls on a first chunk along with a second selectable control from a second plurality of selectable controls of a second chunk to each fall off at the same time or consecutively as a decrease in window size is identified based on the priority list.

Method 300 may be implemented on a computing device or a similar electronic device capable of executing instructions through a processor. The improved user interface may be displayed by any suitable software application. For example, the software application may be one of an email application, a social networking application, project management application, a collaboration application, an enterprise management application, a messaging application, a word processing application, a spreadsheet application, a database application, a presentation application, a contacts application, a calendaring application, and etc. This list is exemplary only and is not limiting. Any suitable application for displaying the improved user interface may be utilized by method 300.

The computing device may be any suitable computing device for executing an application. The computing device may also be referred to herein as the display device. Any suitable computing device may be utilized by method 300 for executing the application and displaying the improved graphic interface. For example, the computing may be at least one of: a mobile telephone; a smart phone; a tablet; a smart watch; a wearable computer; a personal computer; a desktop computer; a laptop computer; and etc. This list is exemplary only and is not limiting. Any suitable computing device or display device for executing the software application displaying the improved user interface may utilized by method 300.

Further, the computing device and application may utilize any suitable method for receiving user commands during method 300. For example, the user may enter commands through the computing device utilizing a keyboard, a touch-sensitive screen, a touchpad, pen, pointer, or a mouse. Further, the improved user interface is scalable according to the screen size of the computing device and/or a window size of the application As such, method 300 begins with an identifying operation 302. At identifying operation 302, a size of the software application window identified. The identification of the size of the window includes identifying any changes in size to the software application window, e.g., due to a change in orientation of the application window. In some embodiments, the window size corresponds to the size of the display screen. In other embodiments, the window is scaled upon receiving a user command to decrease the window size of the application.

However in some embodiments, method 300 starts with an organizing operation 301 and then flows to operation 302. At organizing operation 301, the tabs and selectable controls within a first ribbon and a second ribbon of a silhouette are organized or grouped. In some embodiments, the organizing includes grouping the plurality of software controls according to tasks to be performed by the software application. In these embodiments, the tasks are identified by tabs in the first ribbon. In further embodiments, the organizing includes associating the plurality of the selectable controls in the second ribbon with each of the tabs in the first ribbon. In additional embodiments, operation 301 further includes organizing the selectable controls associated with each tab into logical subgroups within the second ribbon to form a plurality of chunks.

After identifying operation 302, flow continues to calculating layout operation 304 where a layout for a silhouette is calculated. In some embodiments, the layout for the silhouette is calculated at operation 304 by utilizing a priority list.

As discussed above, the priority list orders numerous items (such as selectable controls, tabs, micro-groups, buttons, textual representations, graphical representations, identifiers, ribbons, sizing, spacing, truncation, and/or etc.) for various potential window sizes. Further, the priority list orders when each of these parameters are utilized and may mix and match different parameter rankings interchangeably for different window sizes. The priority list may be determined by a developer of the software application. FIGS. 7 and 8 show how different selectable controls 102 can be ordered and displayed for the same window size for a slide presentation application based on different priority lists created by the same or different developers for a slide presentation application. In some embodiments, the priority list is not modifiable by the user. In alternative embodiments, the priority list may be modified by the user in response to a user selection of a reordering command.

In some embodiments, the layout for the silhouette is calculated at operation 304 by identifying selectable controls for display from potential display controls associated with a designated tab by correlating the size of the software application window to a priority list. The priority list may order each of the potential display controls associated with each of the tabs for overflow according to various potential software application window sizes. In some embodiments, the calculating layout operation 304 further includes moving a subset of the potential display controls within at least one of the chunks between a chunk displayed on the second ribbon that includes the subset and a hidden overflow pane associated with the chunk. In further embodiments, moving the subset of the potential display controls for at least one of the chunks further includes moving a first subset of the potential display controls in the first chunk displayed on the second ribbon to a first hidden overflow pane associated with the first chunk and moving a second subset of the potential display controls in the second chunk displayed on the second ribbon to a second overflow pane associated with the second chunk. In some embodiments, the first subset and the second subset of the potential display controls were previously displayed by the first chunk and second chunk prior to an identification of a new window size and/or prior to the display of the newly calculated layout. In some embodiments, the first subset discussed above includes two different selectable controls that were displayed in the first chunk prior to the moving of the first subset to the first hidden overflow pane. In additional embodiments, the second subset discussed above includes one selectable control that was displayed in the second chunk prior to the moving of the second subset to the second hidden overflow pane.

The selectable controls and tabs are displayed/represented in the first and second ribbons by at least one of a graphical representation and a textual representation. Accordingly, in some embodiments, the layout for the silhouette is calculated at operation 304 by changing the size the of the graphical representation, changing the size of the textual representation, removing a graphical representation, inserting a graphical representation, removing a textual representation, truncating a textual representation, and inserting a textual representation by correlating the size of the software application window to a priority list. The priority list may further order how to represent each of the potential display controls associated with each of the tabs for overflow according to various potential software application window sizes.

In some embodiments, the layout for the silhouette is calculated at operation 304 by identifying the tabs for display from potential tabs by correlating the size of the software application window to a tab rank list within the priority list. Next, during these embodiments, at least one potential tab is moved between a listing on the first ribbon and a hidden tab callout associated with the first ribbon.

In other embodiments, the layout for the silhouette is calculated at operation 304 by moving a second subset of the selectable controls within the first chunk from the first chunk on the second ribbon to the first overflow pane associated with the first chunk after a first subset of the selectable controls within the first chunk were moved from the first chunk to the first overflow pane. The calculated layout for these embodiments further includes hiding the first and second subsets of the selectable controls associated with the first chunk in the first overflow pane associated with the first chunk. In some embodiments, if an increase in window size is detected by the application, the layout moves the first and second subsets from the first overflow pane to the first chunk for display on the second ribbon in reverse order. In other words, the last subset of selectable controls to join the first overflow window (the second subset in this case) is moved first back to the first chunk for display on the second ribbon.

In further embodiments, the layout for the silhouette is calculated at operation 304 by moving a second subset of the selectable controls within a second chunk from the second chunk on the second ribbon to a second overflow pane associated with the second chunk after a first subset of the selectable controls within the first chunk were moved from the first chunk to the first overflow pane. The calculated layout for these embodiments further includes hiding the second subset of the selectable controls within the second chunk in the second overflow pane associated with the second chunk.

Next, flow continues to displaying operation 306. At displaying operation 306, the application displays the silhouette according to the layout calculated by operation 304. The silhouette displays a first ribbon and a second ribbon. The first ribbon includes tabs that identify groupings of selectable controls. The second ribbon includes the groupings of the selectable controls that are each associated with one of the tabs, wherein the groupings of the selectable controls are organized in subgroups that form chunks. Based on the layout calculated by operation 304, the first ribbon displays at least the first designated tab and the second ribbon displays at least the identified selectable controls in the chunks.

When an overflow pane is needed based on the calculated layout, operation 306 includes displaying an overflow identifier for each of the chunks that moved a potential display control to the overflow pane associated with that chunk. Further, when an overflow pane is needed based on the calculated layout, operation 306 includes displaying an overflow button for each of the chunks that moved a potential display control to the overflow pane associated with the chunk to provide access to the hidden overflow pane associated with the chunk. In some embodiments, the overflow button is also the overflow identifier. In alternative embodiments, the overflow button is separate from and different than the overflow identifier.

In some embodiments of method 300, flow from operation 306 continues to receiving operation 308. Flow continues to operation 308 anytime a user command is received or an indication of a user selection is received. At operation 308 a user selection of a command or indication of a user selection is received. Various different commands may be received by the software application by the user. For example, the software application may receive a selection of the overflow button, a selectable control, a tab, unfold button, an expand button, reordering command button, spill over button, a command in a micro-group, etc. In another example, the application may receive a command to change the window size.

In embodiments where a user selected command is received or an indication of a user selection of a command is received, flow continues to implementing operation 310. At implementing operation 310, the received command is implemented by the software application and/or the processor of the computing device.

In some embodiments, a user selection of the overflow button is received at operation 308. In these embodiments, implementing operation 310 displays the hidden overflow pane associated with the chunk. The hidden overflow pane includes a list of potential display controls that were not identified by the layout. The potential controls that were not identified by the layout are the controls that based on the scaling logic of the priority list have been moved from the second ribbon to the appropriate chunk's overflow pane. In some embodiments, the overflow pane associated with the chunk displays the potential display controls that were not identified by the layout in a way that is similar to or the same as the order these selectable controls are displayed in when listed in the associated chunk in the second ribbon. Accordingly, the listing of selectable controls in the overflow pane maintains the same or similar feel to the display of these controls within their associated chunk on the second ribbon.

In some embodiments, a user selection of a new tab is received at operation 308. In these embodiments, implementing operation 310 performs operations 302, 304, and 306 accordingly for the newly designated tab. For example, during this embodiment, at operation 304 a second or new layout for the silhouette is calculated by identifying selectable controls for display from potential display controls associated with a newly designated tab by correlating the size of the software application window identified at operation 302 to the priority list. In some embodiments, this calculation of a new layout at operation 304 includes moving a new subset of the potential display controls within at least one of the new chunks between a new chunk displayed on the second ribbon that includes the new subset and a new hidden overflow pane associated with the new chunk. Based on this new layout, at displaying operation 306 the first ribbon displays the newly designated tab and the second ribbon displays the identified selectable controls associated with the new tab in the new chunks. Additionally, based on this new layout, at display operation 306 the second ribbon displays at least one of an overflow identifier and an overflow button.

In some embodiments, a user selection of a selectable control is received at operation 308. In these embodiments, implementing operation 310 applies a control to an object in a workspace of the software application in response to the selected control.

In some embodiments, a user selection of a reordering command button is received at operation 308. In these embodiments, implementing operation 310 reorders the priority list according to the preferences selected by the user.

In additional embodiments, a user selection of an expand button is received at operation 308. In these embodiments, implementing operation 310 displays the concealed selectable control in a pop-up flyout. In some embodiments, the pop-up flyout is associated with the chunk associated with the concealed selectable parameter.

In further embodiments, a user selection of an unfold button is received at operation 308. In these embodiments, implementing operation 310 displays the commands listed in a callout for a micro-group.

In other embodiments, a user selection of a spillover button is received at operation 308. In these embodiments, implementing operation 310 displays the tab callout listing the hidden tabs in the first ribbon.

In some embodiments, a user selection of a command to change the application window size is received at operation 308. In these embodiments, implementing operation 310 changes and displays window size of the application according to the selection of the user. After a change in window has been implemented by at operation 310, flow continues to operations 302.

Figure 14:
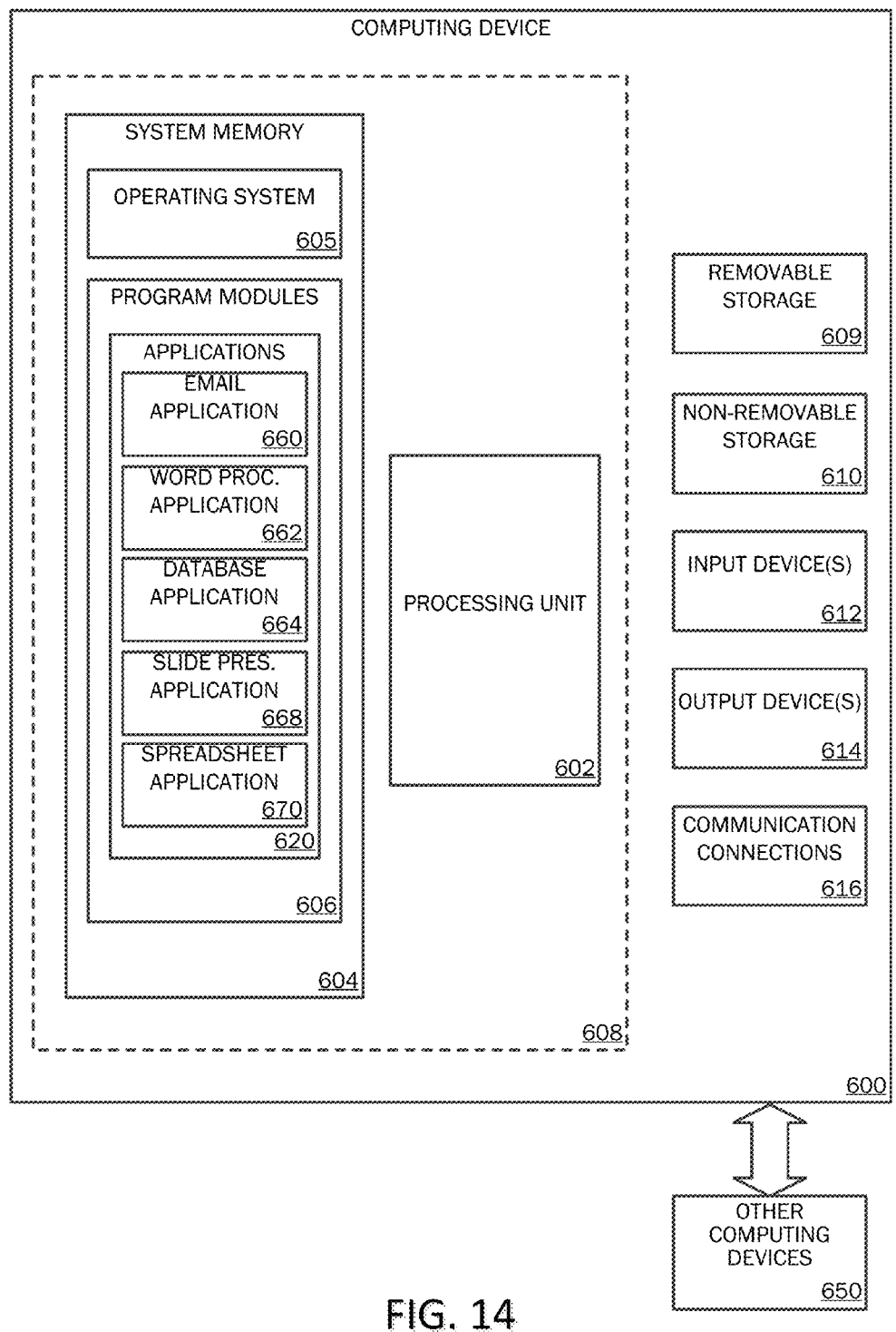
FIG. 14 is a block diagram illustrating example physical components of a computing device with which embodiments of the disclosure may be practiced.
Figure 15A:
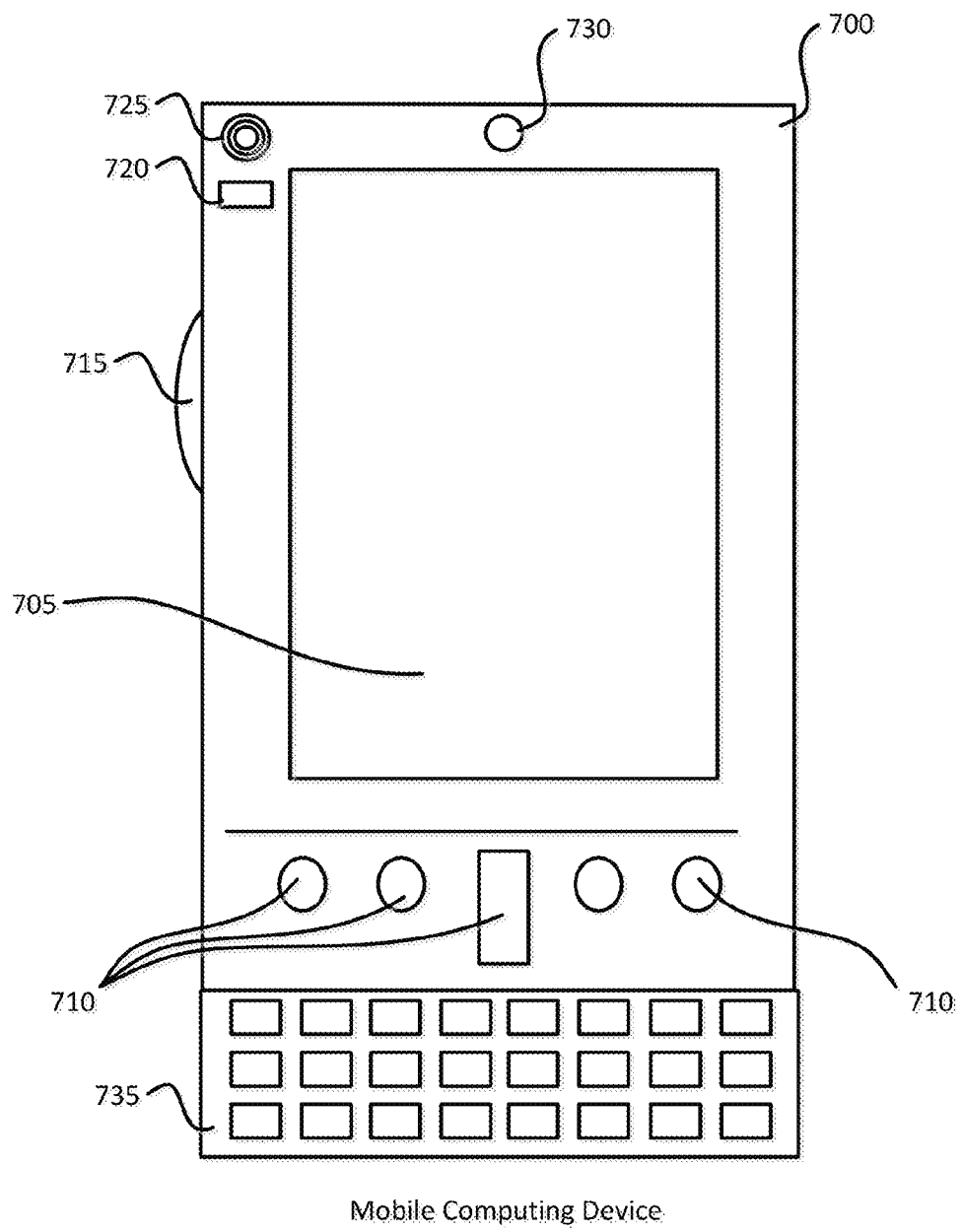
FIGS. 15A and 15B are simplified block diagrams of a mobile computing device with which embodiments of the present disclosure may be practiced.
Figure 15B:
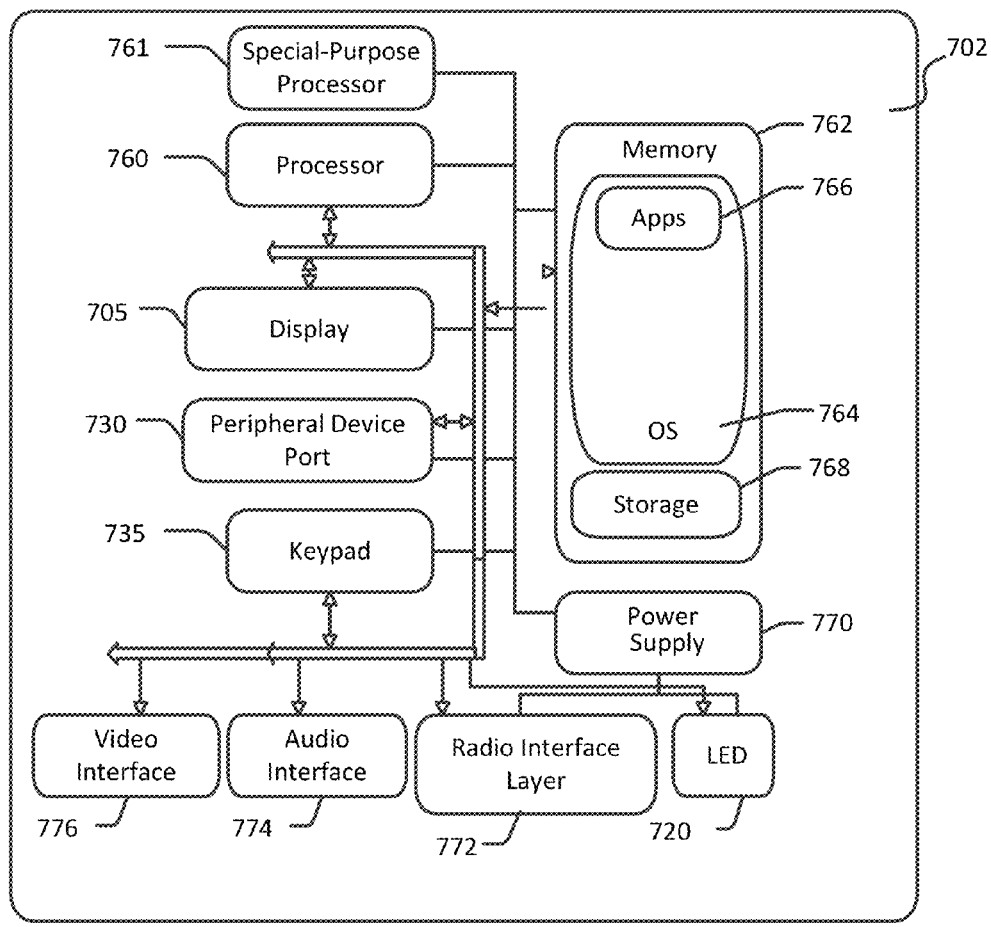
Figure 16:
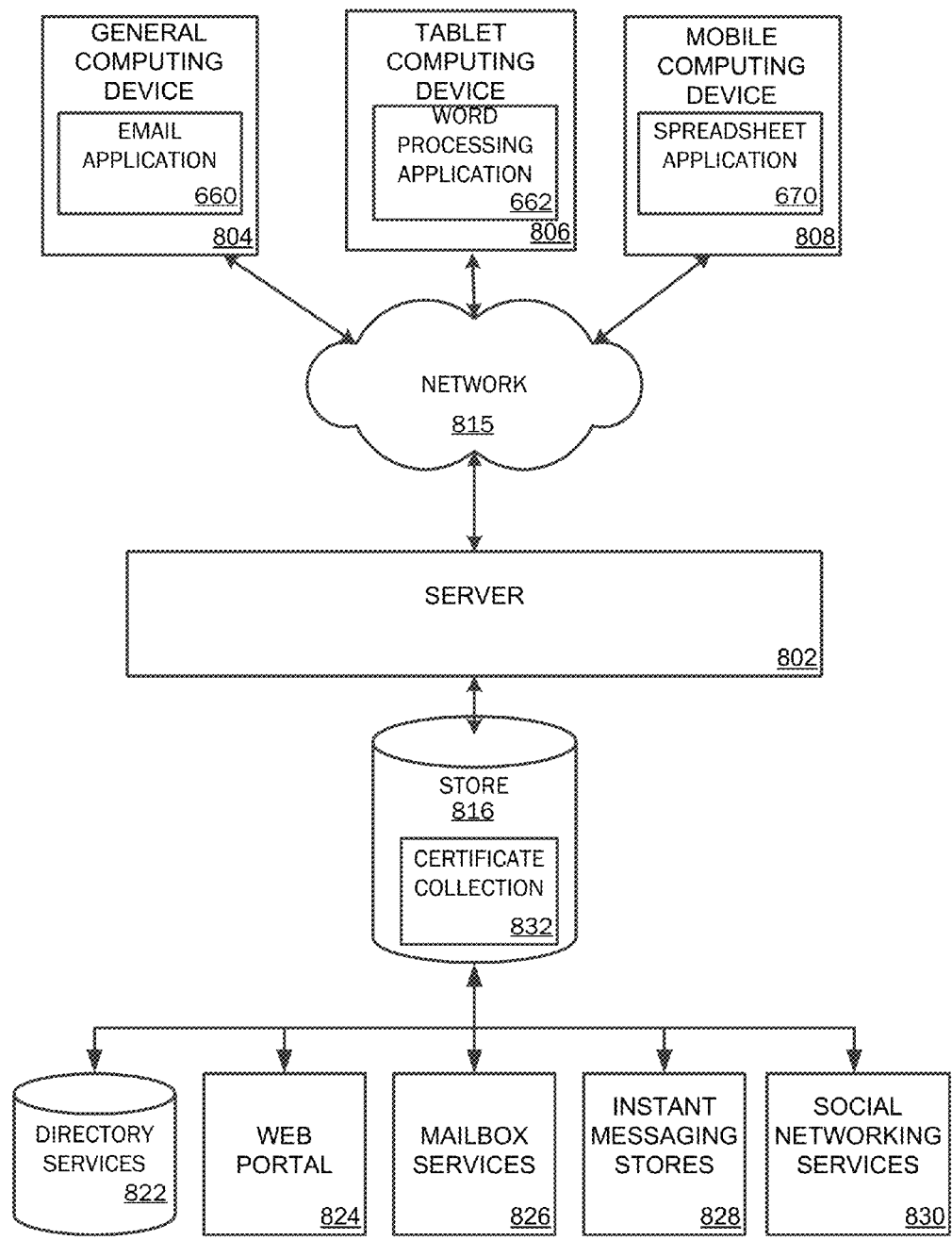
FIG. 16 is a simplified block diagram of a distributed computing system in which embodiments of the present disclosure may be practiced.

FIGS. 14-16 and the associated descriptions provide a discussion of a variety of operating environments in which embodiments of the disclosure may be practiced. However, the devices and systems illustrated and discussed with respect to FIGS. 14-16 are for purposes of example and illustration and are not limiting of a vast number of computing device configurations that may be utilized for practicing embodiments of the disclosure, described herein FIG. 14 is a block diagram illustrating physical components (e.g., hardware) of a computing device 600 with which embodiments of the disclosure may be practiced. The computing device components described below may be computer executable instructions for an email application 660, word processing application 662, database application 664, slide presentation application 668, spreadsheet application 670, and any other suitable application that can be executed to employ the method 300 disclosed herein. In a basic configuration, the computing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories. The system memory 604 may include an operating system 605 and one or more program modules 606 suitable for running software applications 620 utilizing the improved silhouette as illustrated in to FIGS. 2-12. The operating system 605, for example, may be suitable for controlling the operation of the computing device 600. Furthermore, embodiments of the disclosure may be practiced in conjunction with a graphics library, other operating systems, or any other application program and is not limited to any particular application or system. This basic configuration is illustrated in FIG. 14 by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated in FIG. 14 by a removable storage device 609 and a non-removable storage device 610.

As stated above, a number of program modules and data files may be stored in the system memory 604. While executing on the processing unit 602, the program modules 606 (e.g., validation module 611 or email application) may perform processes including, but not limited to, the embodiment, as described herein. Other program modules that may be used in accordance with embodiments of the present disclosure, and in particular to generate screen content, may include electronic mail and contacts applications, contact applications, drawing applications, messaging applications, calendaring applications, a social networking application, project management application, a collaboration application, an enterprise management application, and/or etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 14 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 600 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 600 may also have one or more input device(s) 612 such as a keyboard, a mouse, a pen, a sound or voice input device, a touch or swipe input device, etc. The output device(s) 614 such as a display, speakers, a printer, etc. may also be included. The aforementioned devices are examples and others may be used. The computing device 600 may include one or more communication connections 616 allowing communications with other computing devices 618. Examples of suitable communication connections 616 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (e.g., memory storage) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 15A and 15B illustrate a mobile computing device 700, for example, a mobile telephone, a smart phone, wearable computer (such as a smart watch), a tablet personal computer, a laptop computer, a desktop computer, and the like, with which embodiments of the disclosure may be practiced. In some embodiments, the client may be a mobile computing device. With reference to FIG. 15A, one embodiment of a mobile computing device 700 for implementing the embodiments is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. The display 705 of the mobile computing device 700 may also function as an input device (e.g., a touch screen display). If included, an optional side input element 715 allows further user input. The side input element 715 may be a rotary switch, a button, or any other type of manual input element. In alternative embodiments, mobile computing device 700 may incorporate more or less input elements. For example, the display 705 may not be a touchpad in some embodiments. In yet another alternative embodiment, the mobile computing device 700 is a portable phone system, such as a cellular phone. The mobile computing device 700 may also include an optional keypad 735. Optional keypad 735 may be a physical keypad or a "soft" keypad generated on the touch screen display. In various embodiments, the output elements include the display 705 for showing a graphical user interface (GUI), a visual indicator 720 (e.g., a light emitting diode), and/or an audio transducer 725 (e.g., a speaker). In some embodiments, the mobile computing device 700 incorporates a vibration transducer for providing the user with tactile feedback. In yet another embodiment, the mobile computing device 700 incorporates input and/or output ports, such as an audio input (e.g., a microphone jack), an audio output (e.g., a headphone jack), and a video output (e.g., a HDMI port) for sending signals to or receiving signals from an external device.

FIG. 15B is a block diagram illustrating the architecture of one embodiment of a mobile computing device. That is, the mobile computing device 700 can incorporate a system (e.g., an architecture) 702 to implement some embodiments. In one embodiment, the system 702 is implemented as a "smart phone" capable of running one or more applications (e.g., browser, e-mail, calendaring, contact managers, messaging clients, games, and media clients/players). In some embodiments, the system 702 is integrated as a computing device, such as an integrated personal digital assistant (PDA) and wireless phone.

One or more application programs 766 may be loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700, including the instructions to validate a signing certificate in a multi-tenant environment as described herein (e.g., and/or optionally validation module 611).

The system 702 has a power supply 770, which may be implemented as one or more batteries. The power supply 770 might further include an external power source, such as an AC adapter or a powered docking cradle that supplements or recharges the batteries.

The system 702 may also include a radio 772 that performs the function of transmitting and receiving radio frequency communications. The radio 772 facilitates wireless connectivity between the system 702 and the "outside world," via a communications carrier or service provider. Transmissions to and from the radio 772 are conducted under control of the operating system 764. In other words, communications received by the radio 772 may be disseminated to the application programs 766 via the operating system 764, and vice versa.

The visual indicator 720 may be used to provide visual notifications, and/or an audio interface 774 may be used for producing audible notifications via the audio transducer 725. In the illustrated embodiment, the visual indicator 720 is a light emitting diode (LED) and the audio transducer 725 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. In accordance with embodiments of the present disclosure, the microphone may also serve as an audio sensor to facilitate control of notifications, as will be described below. The system 702 may further include a video interface 776 that enables an operation of an on-board camera 730 to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 15B by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio 772 or via a distributed computing network. Similarly, such data/information may be readily transferred between computing devices for storage and use according to well-known data/information transfer and storage means, including electronic mail and collaborative data/information sharing systems.

FIG. 16 illustrates one embodiment of the architecture of a system for processing data received at a computing system from a remote source, such as a computing device 804, tablet 806, or mobile device 808, as described above. Content displayed at server device 802 may be stored in different communication channels or other storage types. In this embodiment, the general computing device 804 is executing an email application 660 that utilizes the improved graphic interface for a silhouette. Further, in this embodiment, the tablet 806 is executing a word processing application 662 utilizing the improved graphic interface for a silhouette. Additionally, in this embodiment, the mobile computing device 808 is executing a spreadsheet application utilizing the improved graphic interface for a silhouette. The improved graphic interface for a silhouette and a method for generating the improved graphic interface are described in detail above and illustrated in FIGS. 2-13. For example, various documents may be stored using a directory service 822, a web portal 824, a mailbox service 826, an instant messaging store 828, or a social networking site 830. Any of these embodiments of the computing devices, 804, 806, 808 may obtain content from the store 816.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the disclosure as claimed in any way. The embodiments, examples, and details provided in this application are considered sufficient to convey possession and enable others to make and use the best mode of claimed disclosure. The claimed disclosure should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed disclosure.

Additionally, while the embodiments may be described in the general context of improved silhouettes that execute in conjunction with an application program that runs on an operating system on a computing device, those skilled in the art will recognize that aspects may also be implemented in combination with other program modules. In further embodiments, the embodiments disclosed herein may be implemented in hardware.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or compact servers, an application executed on a single computing device, and comparable systems.

The invention claimed is:

1. A method for providing functionality from a software application by displaying and scaling an improved user interface at a display device, the method comprising:
   identifying a size of a software application window, wherein the identifying the size includes identifying a change in the size of the software application window;
   calculating a first layout, the calculating the first layout includes identifying selectable controls for display from potential display controls associated with a first designated tab by correlating the size of the software application window to a priority list; and
   displaying the first layout, the first layout comprising:
      a first ribbon, and
      a second ribbon including groupings of selectable controls that are organized into subgroups that form chunks;
   wherein the priority list orders each of the potential display controls for overflow according to various potential software application window sizes, and
   wherein calculating the first layout includes moving a subset of the potential display controls within at least one of the chunks between a chunk displayed on the second ribbon that includes the subset and a hidden overflow pane associated with the chunk.

2. The method of claim 1, wherein the identified selectable controls include at least one of a graphical representation and a textual representation, and wherein calculating the first layout further comprises at least one of:
   changing a size the of the graphical representation;
   changing a size of the textual representation,
   removing the graphical representation;
   inserting the graphical representation;
   removing the textual representation; and
   inserting the textual representation.

3. The method of claim 1, further comprising:
   reordering at least a portion of the priority list in response to user selection of a reordering command.

4. The method of claim 1, further comprising:
   receiving an indication of a selection of one of the identified selectable controls;
   applying a control to an object in a workspace of the software application in response to the indication of the selection.

5. The method of claim 1, wherein calculating the first layout further comprises:
   identifying tabs for display from potential tabs by correlating the size of the software application window to a tab rank list; and
   moving at least one potential tab between a listing on the first ribbon and a hidden tab callout associated with the first ribbon.

6. The method of claim 1, wherein the chunks include at least a first chunk and a second chunk, and wherein moving the subset of the potential display controls for at least one of the chunks further comprises:
   moving a first subset of the potential display controls in the first chunk displayed on the second ribbon to a first hidden overflow pane associated with the first chunk, wherein the first subset of the potential display controls were displayed by the first chunk prior to the displaying the first layout; and
   moving a second subset of the potential display controls in the second chunk displayed on the second ribbon to a second hidden overflow pane associated with the second chunk, wherein the second subset of the potential display controls were displayed by the second chunk prior to the displaying the first layout.

7. The method of claim 6, wherein:
   the first subset includes two different selectable controls that were displayed in the first chunk prior to moving the first subset to the first hidden overflow pane, and
   the second subset includes one selectable control that was displayed in the second chunk prior to moving the second subset to the second hidden overflow pane.

8. The method of claim 1, further comprising:
   displaying an overflow identifier for each of the chunks that moved the subset of the potential display controls to the hidden overflow pane associated with the chunk.

9. The method of claim 8, further comprising:
   displaying an overflow button for each of the chunks that moved the subset of the potential display controls to the hidden overflow pane associated with the chunk to provide access to the hidden overflow pane associated with the chunk;
   wherein the hidden overflow pane associated with the chunk is displayed upon receiving a user selection of the overflow button.

10. The method of claim 9, wherein the overflow button is also the overflow identifier.

11. The method of claim 9, wherein the overflow button is separate from the overflow identifier.

12. The method of claim 1, further comprising:
   organizing the hidden overflow pane associated with the chunk to display the subset of the potential display controls that were not identified in a way that is similar to an order displayed by the subset of the potential display controls when listed in the chunk in the second ribbon.

13. The method of claim 1, wherein the display device comprises at least one of:
   a mobile telephone;
   a smart phone;
   a tablet;
   a smart watch;
   a wearable computer;
   a personal computer;
   a desktop computer; and
   a laptop computer.

14. The method of claim 13, wherein the first ribbon and the second ribbon are capable of receiving user selections from a mouse, a touchpad, a keyboard, and a pen of the display device.

15. The method of claim 1, wherein the software application is at least one of:
an email application;
a social networking application;
a project management application;
a collaboration application;
an enterprise management application;
a messaging application;
a word processing application;
a spreadsheet application;
a database application;
a presentation application;
a contacts application; and
a calendaring application.

16. The method of claim 1, further comprising:
receiving an indication of a selection of a second tab to define a second designated tab; and
calculating a second layout, the calculating the second layout includes identifying new selectable controls for display from the potential display controls associated with the second designated tab by correlating the size of the software application window to the priority list;
wherein the second ribbon displays the identified new selectable controls in new chunks based on the second layout, and
wherein calculating the second layout includes moving a new subset of the potential display controls within at least one of the new chunks between a new chunk displayed on the second ribbon that includes the new subset and a new hidden overflow pane associated with the new chunk.

17. A system comprising:
a software application executed at least in part by a computing device, the computing device comprising:
at least one processor;
a memory for containing computer-executable instructions, which when executed by the at least one processor, cause a software application to perform a method comprising:
organizing a plurality of selectable controls within a silhouette, the silhouette including a first ribbon and a second ribbon;
calculating a layout for the plurality of selectable controls for a first selected tab to accommodate one of a size of a software application window and a change in the size of the software application window utilizing a priority list, wherein the priority list orders each selectable control in the plurality of selectable controls associated with each tab for overflow, and
wherein calculating the layout includes moving a first subset of the plurality of selectable controls within a first chunk between the first chunk on the second ribbon and a first overflow pane associated with the first chunk; and
displaying the first ribbon and the second ribbon based on the layout, wherein the layout displays at least a portion of the plurality of selectable controls associated with the first selected tab in chunks and hides the first subset of the plurality of selectable controls within the first chunk in the first overflow pane associated with the first chunk.

18. The system of claim 17, wherein calculating the layout includes moving a second subset of the plurality of selectable controls within the first chunk between the first chunk on the second ribbon and the first overflow pane associated with the first chunk, and
wherein the layout further hides the second subset of the plurality of selectable controls within the first chunk in the first overflow pane associated with the first chunk.

19. The system of claim 17, wherein calculating the layout includes moving a second subset of the plurality of selectable controls within a second chunk between the second chunk on the second ribbon and a second overflow pane associated with the second chunk, and
wherein the layout further hides the second subset of the plurality of selectable controls within the second chunk in the second overflow pane associated with the second chunk.

20. A system comprising:
a software application executed at least in part by a computing device, the computing device comprising:
at least one processor;
a memory for containing computer-executable instructions, which when executed by the at least one processor, cause a software application to perform a method comprising:
identifying a size of a software application window, wherein the identifying the size includes identifying a change in the size of the software application window;
calculating a first layout, the calculating the first layout includes identifying selectable controls for display from potential display controls associated with a first designated tab by correlating the size of the software application window to a priority list; and
displaying the first layout, the first layout comprising:
a first ribbon, and
a second ribbon including groupings of selectable controls that are organized into subgroups that form chunks;
wherein the priority list orders each of the potential display controls for overflow according to various potential software application window sizes, and
wherein calculating the first layout includes moving a subset of the potential display controls within at least one of the chunks between a chunk displayed on the second ribbon that includes the subset and a hidden overflow pane associated with the chunk.

* * * * *